United States Patent
Kimura et al.

(10) Patent No.: US 9,043,858 B2
(45) Date of Patent: May 26, 2015

(54) DIGITAL BROADCAST RECEIVER AND INFORMATION UPDATING METHOD THEREFOR

(71) Applicant: MITSUBISHI ELECTRIC CORPORATION, Tokyo (JP)

(72) Inventors: Aki Kimura, Tokyo (JP); Keiichi Shirasuka, Tokyo (JP); Kazuya Takaki, Tokyo (JP); Soichiro Matsumoto, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/094,412

(22) Filed: Dec. 2, 2013

(65) Prior Publication Data

US 2014/0173679 A1    Jun. 19, 2014

(30) Foreign Application Priority Data

Dec. 13, 2012    (JP) ................................. 2012-271973

(51) Int. Cl.

| | |
|---|---|
| *H04N 21/435* | (2011.01) |
| *H04N 21/45* | (2011.01) |
| *H04N 21/414* | (2011.01) |
| *H04N 21/426* | (2011.01) |
| *H04N 21/438* | (2011.01) |
| *H04N 21/442* | (2011.01) |
| *H04H 60/42* | (2008.01) |

(52) U.S. Cl.
CPC ..... *H04N 21/4524* (2013.01); *H04N 21/41422* (2013.01); *H04N 21/4263* (2013.01); *H04N 21/4383* (2013.01); *H04N 21/44209* (2013.01); *H04H 60/42* (2013.01)

(58) Field of Classification Search
None
See application file for complete search history.

(56) References Cited

U.S. PATENT DOCUMENTS

| | | | |
|---|---|---|---|
| 8,719,147 B1 * | 5/2014 | Broyles et al. | 705/37 |
| 2010/0220818 A1 * | 9/2010 | Yamamoto et al. | 375/340 |
| 2011/0159800 A1 * | 6/2011 | Ueoka et al. | 455/3.06 |
| 2012/0133840 A1 | 5/2012 | Shirasuka et al. | |

FOREIGN PATENT DOCUMENTS

| | | |
|---|---|---|
| JP | 2006-067489 A | 3/2006 |
| JP | 2006-174208 A | 6/2006 |
| JP | 2007-019920 A | 1/2007 |

(Continued)

*Primary Examiner* — Nasser Goodarzi
*Assistant Examiner* — Adil Ocak
(74) *Attorney, Agent, or Firm* — Birch, Stewart, Kolasch & Birch, LLP

(57) ABSTRACT

A digital broadcast receiver on a mobile body includes: a tuner that receives a broadcast signal of a physical channel; a signal intensity detector that detects a signal intensity of the broadcast signal; a current position detector that detects a current position of the mobile body; a movement direction detector that detects a movement direction of the mobile body; a reception judging unit that controls the tuner to judge whether the physical channel can be received; an area information storage unit that stores receivable area information indicating a receivable area of the physical channel; and an area information updating unit that determines, when it is judged that the physical channel can be received, a position apart from the current position in the movement direction according to the signal intensity as a receivable position, and updates the receivable area information to extend the receivable area to the receivable position.

20 Claims, 21 Drawing Sheets

(56) References Cited

FOREIGN PATENT DOCUMENTS

| | | | |
|---|---|---|---|
| JP | 2009-005006 A | 1/2009 | |
| JP | 2009-081558 A | 4/2009 | |
| JP | 2011-061753 A | 3/2011 | |
| JP | 2012-049853 A | 3/2012 | |
| JP | 2012-049857 A | 3/2012 | |
| WO | WO 2011/030475 A1 | 3/2011 | |

\* cited by examiner

FIG.3

| PHYSICAL CHANNEL | NETWORK NAME | TS NAME | SERVICE NAME | VERTEX LIST (POLYGON INFORMATION) | | | | | UNCONNECTED VERTEX LIST | RELAY STATION CHANNEL | AFFILIATED STATION CHANNEL |
|---|---|---|---|---|---|---|---|---|---|---|---|
| 13ch | LLL | EEEE | RRR | $(x_{10}, y_{10})$ | $(x_{11}, y_{11})$ | ...... | $(x_{1m}, y_{1m})$ | | $(x_{50}, y_{50}), (x_{51}, y_{51})$ | 20ch, 32ch | 25ch |
| 14ch | MMM | FFFF | SSS | $(x_{20}, y_{20})$ | $(x_{21}, y_{21})$ | ...... | $(x_{2n}, y_{2n})$ | | $(x_{60}, y_{60})$ | 33ch | 40ch |
| | | | | $(x_{30}, y_{30})$ | $(x_{31}, y_{31})$ | ...... | $(x_{3p}, y_{3p})$ | | $(x_{70}, y_{70})$ | | |
| 18ch | NNN | GGGG | TTT | $(x_{40}, y_{40})$ | $(x_{41}, y_{41})$ | ...... | $(x_{4p}, y_{4p})$ | | $(x_{80}, y_{80}), (x_{81}, y_{81})$ | 28ch | 37ch |

FIG.23

| PHYSICAL CHANNEL | NETWORK NAME | TS NAME | SERVICE NAME | RECEPTION POSITION | RECEPTION INTENSITY | RECEPTION DATE AND TIME | WEATHER |
|---|---|---|---|---|---|---|---|
| 13ch | LLL | EEEE | RRR | $(x_{10}, y_{10})$ | AA | y1m1d1:h1m1s1 | CLOUDY |
| 14ch | MMM | FFFF | SSS | $(x_{30}, y_{30})$ | CC | y2m2d2:h2m2s2 | CLEAR |
| ⋮ | | | | | | | |
| 18ch | NNN | GGGG | TTT | $(x_{40}, y_{40})$ | ZZ | y3m3d3:h3m3s3 | RAINY |
| ⋮ | | | | | | | |

2300

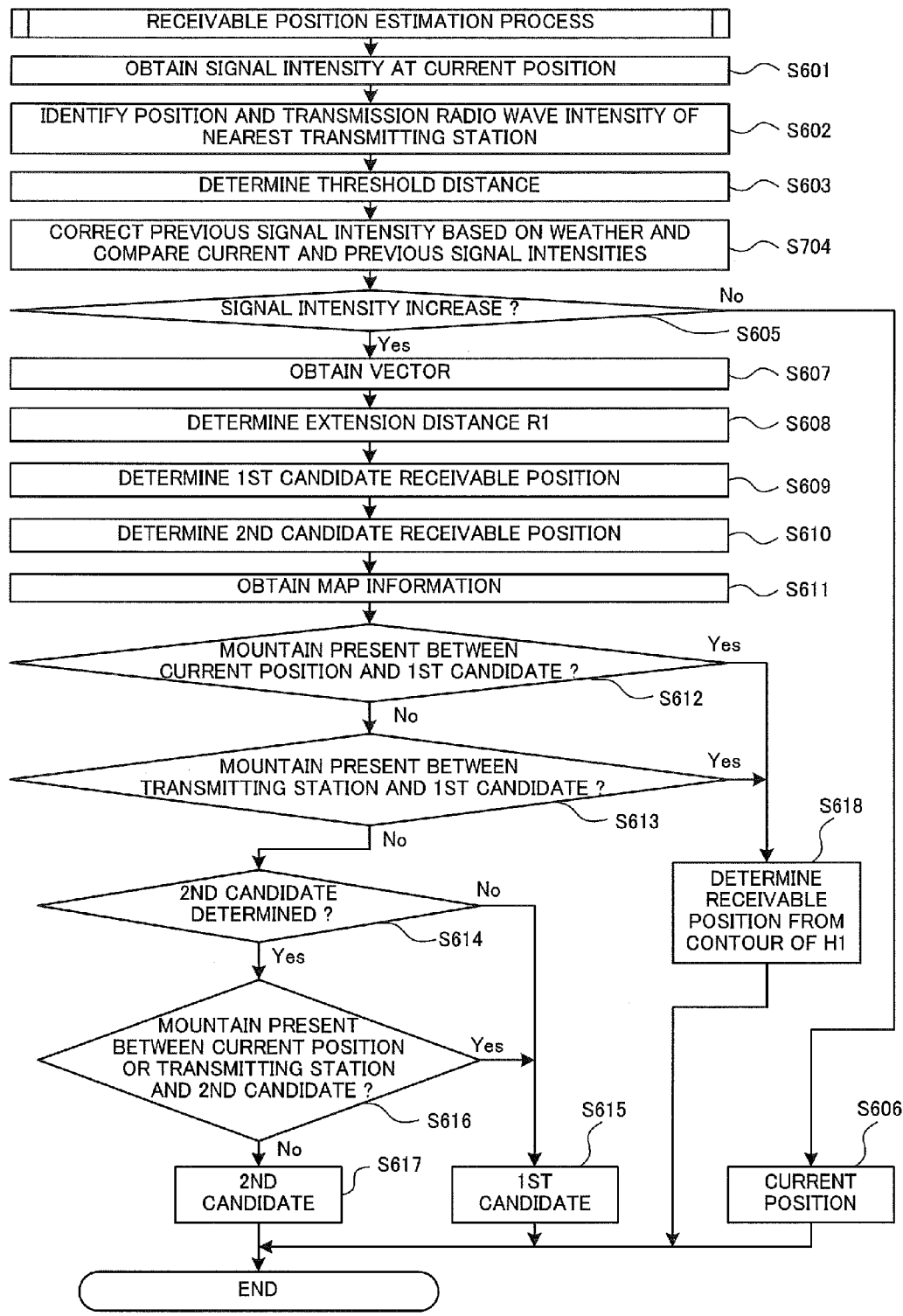

DIGITAL BROADCAST RECEIVER AND INFORMATION UPDATING METHOD THEREFOR

BACKGROUND OF THE INVENTION

1. Field of the Invention

The present invention relates to a digital broadcast receiver and an information updating method therefor.

2. Description of the Related Art

When a mobile body with a digital broadcast receiver moves from a receivable area of a physical channel (i.e., a channel occupying a particular frequency band defined as a unit) received by the digital broadcast receiver to an unreceivable area, viewing of a broadcast service provided by the physical channel becomes impossible. In such a case, a user manually operates the digital broadcast receiver to perform a channel scan to detect receivable physical channels, and selects a physical channel providing the same broadcast service from the detected physical channels.

Japanese Patent Application Publication No. 2011-61753 discloses a digital broadcast receiver having a function of automatically selecting a physical channel without manual operation as described above. While the digital broadcast receiver uses a first tuner/demodulator to perform channel selection for program viewing, it uses a second tuner/demodulator to perform a channel scan for sequentially selecting physical channels to detect receivable physical channels, and generates and stores receivable area information indicating a receivable area of each physical channel. When a reception state of a currently received physical channel is deteriorated, the digital broadcast receiver automatically switches from the currently received physical channel to another physical channel receivable at the current position based on the receivable area information and the current position.

Moreover, the above digital broadcast receiver represents a receivable area of a physical channel by a polygon. When a channel scan at the current position reveals that the physical channel can be received at the current position, if the current position is outside the existing receivable area, the digital broadcast receiver adds a new area having a vertex at the current position to the existing receivable area to extend the receivable area.

It is desired to efficiently extend a receivable area indicated by receivable area information in a digital broadcast receiver mounted on a mobile body.

SUMMARY OF THE INVENTION

In an aspect of the present invention, it is intended to provide a digital broadcast receiver and an information updating method therefor capable of efficiently extending a receivable area indicated by receivable area information.

According to an aspect of the present invention, there is provided a digital broadcast receiver mounted on a mobile body, the digital broadcast receiver including: a tuner configured to receive a broadcast signal of a physical channel transmitted by digital broadcasting; a signal intensity detector configured to detect a signal intensity of the broadcast signal received by the tuner; a current position detector configured to detect a current position of the mobile body; a movement direction detector configured to detect a movement direction of the mobile body; a reception judging unit configured to control the tuner to judge whether or not the physical channel can be received; an area information storage unit configured to store receivable area information indicating a receivable area of the physical channel; and an area information updating unit configured to determine, when the reception judging unit judges that the physical channel can be received, a position apart from the current position detected by the current position detector in the movement direction detected by the movement direction detector according to the signal intensity detected by the signal intensity detector as a receivable position, and update the receivable area information stored in the area information storage unit so as to extend the receivable area indicated by the receivable area information to the receivable position.

According to another aspect of the present invention, there is provided a method of updating information for a digital broadcast receiver that is mounted on a mobile body and includes a tuner for receiving a broadcast signal of a physical channel transmitted by digital broadcasting, the method including: detecting a signal intensity of the broadcast signal received by the tuner; detecting a current position of the mobile body; detecting a movement direction of the mobile body; controlling the tuner to judge whether or not the physical channel can be received; and determining, when it is judged that the physical channel can be received, a position apart from the detected current position in the detected movement direction according to the detected signal intensity as a receivable position, and updating receivable area information indicating a receivable area of the physical channel so as to extend the receivable area indicated by the receivable area information to the receivable position.

BRIEF DESCRIPTION OF THE DRAWINGS

In the attached drawings:

FIG. 3 is a diagram illustrating an example of broadcast area map information stored in a broadcast area map storage unit in the first embodiment in a table form;

FIG. 23 is a diagram illustrating an example of a reception information table in a fourth embodiment; and FIG. 24 is a flowchart illustrating a receivable position estimation process in the fourth embodiment.

DETAILED DESCRIPTION OF THE INVENTION

Figure 1:
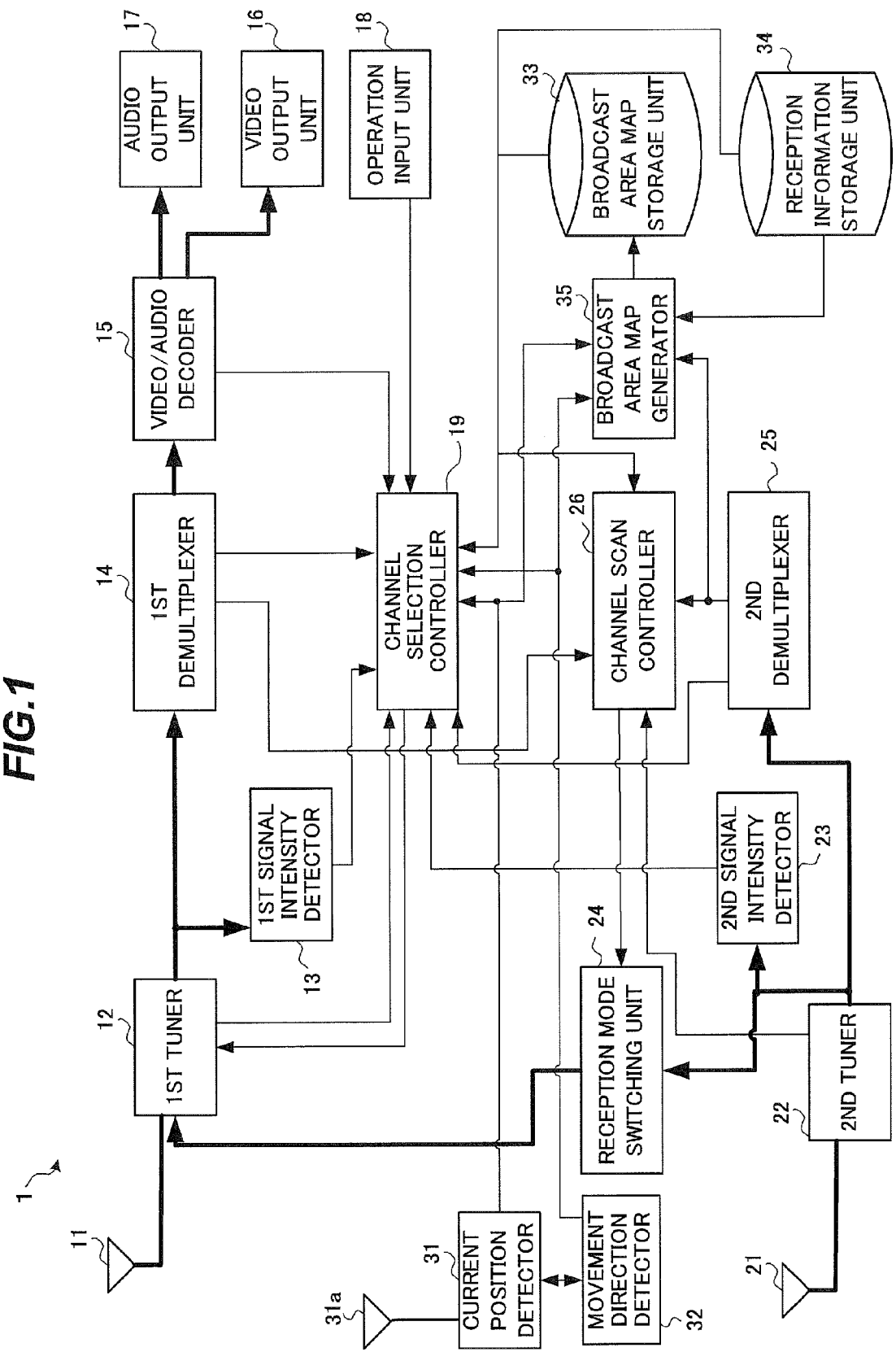
FIG. 1 is a block diagram schematically illustrating a configuration of a digital broadcast receiver according to a first embodiment.

Embodiments of the invention will now be described with reference to the attached drawings, in which like elements are indicated by like reference characters.

First Embodiment

FIG. 1 is a block diagram schematically illustrating a configuration of a digital broadcast receiver 1 in a first embodiment. The digital broadcast receiver 1 is mounted on a mobile body such as a vehicle or a mobile terminal, and receives a broadcast signal of digital broadcasting.

In FIG. 1, the digital broadcast receiver 1 includes, as a section for program viewing, a first antenna 11, a first tuner 12, a first signal intensity detector 13, a first demultiplexer 14, a video/audio decoder 15, a video output unit 16, an audio output unit 17, an operation input unit 18, and a channel selection controller 19.

The first antenna 11 and the first tuner 12 form one system of a broadcast receiving section. The first tuner 12 selects and receives, through the first antenna 11, a broadcast signal of a physical channel designated from among a plurality of physical channels transmitted by digital broadcasting. Specifically, according to a designation from the channel selection controller 19 described later, the first tuner 12 selects the designated physical channel, demodulates a broadcast signal of the selected physical channel, and outputs the demodulated signal to the first demultiplexer 14. The term 'physical channel' refers to a channel occupying a particular frequency band defined as a unit.

The first signal intensity detector 13 detects a signal intensity of the broadcast signal received by the first tuner 12, and notifies information indicating the detected signal intensity to the channel selection controller 19.

The first demultiplexer 14 performs a demultiplexing process on the signal from the first tuner 12, and outputs the obtained signal to the video/audio decoder 15.

The video/audio decoder 15 performs a decoding process on the signal from the first demultiplexer 14 to obtain a video signal and an audio signal, and outputs the obtained video signal and audio signal to the video output unit 16 and the audio output unit 17 respectively.

The video output unit 16 displays video based on the video signal outputted from the video/audio decoder 15 on a display unit (not illustrated), or outputs the video signal from an output terminal (not illustrated). The video output unit 16 may superimpose graphic data produced in the digital broadcast receiver 1 on the video based on the video signal outputted from the video/audio decoder 15 to display or output the obtained video signal.

The audio output unit 17 outputs audio based on the audio signal outputted from the video/audio decoder 15 from a speaker (not illustrated), or outputs the audio signal from an output terminal (not illustrated).

The operation input unit 18 is a user interface that receives an operation from a user to the digital broadcast receiver 1, such as operation buttons or a touch panel.

The channel selection controller 19 controls the first tuner 12 to perform channel selection for viewing a program. Specifically, the channel selection controller 19 selects a physical channel to be viewed from among the plurality of physical channels, and controls the first tuner 12 to select the physical channel to be viewed. For example, according to a channel selection instruction inputted to the operation input unit 18 from the user, the channel selection controller 19 causes the first tuner 12 to select a physical channel designated by the channel selection instruction.

Further, the digital broadcast receiver 1 includes, as a section for a channel scan, a second antenna 21, a second tuner 22, a second signal intensity detector 23, a reception mode switching unit 24, a second demultiplexer 25, and a channel scan controller (or a reception judging unit) 26.

The second antenna 21 and the second tuner 22 form one system of a broadcast receiving section different from the system formed by the first antenna 11 and the first tuner 12, and can operate independently of the system formed by the first antenna 11 and the first tuner 12. The second tuner 22 selects and receives, through the second antenna 21, a broadcast signal of a physical channel designated from among the plurality of physical channels transmitted by digital broadcasting. Specifically, the second tuner 22 selects a physical channel according to an instruction from the reception mode switching unit 24 described later, demodulates the broadcast signal of the selected physical channel, and outputs the demodulated signal to the second demultiplexer 25 or the reception mode switching unit 24.

The second signal intensity detector 23 detects a signal intensity of the broadcast signal received by the second tuner 22, and notifies information indicating the detected signal intensity to the channel selection controller 19 and the like.

The reception mode switching unit 24 switches a reception mode of the digital broadcast receiver 1 between a double tuner mode and a single tuner mode. The double tuner mode is a mode in which each of the two systems (or the first tuner 12 and the second tuner 22) outputs a demodulated signal. The single tuner mode is a mode in which the first tuner 12 outputs a single signal with high reception stability by performing diversity processing on signals received by the antennas of the two systems to synthesize these signals. The reception mode switching unit 24 switches the reception mode, when receiving a switching control signal for instructing switching from the channel scan controller 26, or when receiving a reception mode switching instruction from the user through the operation input unit 18. The single tuner mode and the double tuner mode will be described in more detail below.

In the single tuner mode, the second tuner 22 selects a physical channel to be viewed selected by the first tuner 12 according to an instruction from the reception mode switching unit 24, and outputs the received signal to the first tuner 12 through the reception mode switching unit 24. The first tuner 12 receives, through the first antenna 11, a broadcast signal of a physical channel to be viewed designated by the channel selection controller 19, and performs diversity processing on the broadcast signal received from the first antenna 11 and the broadcast signal inputted from the second antenna 21 through the second tuner 22 and the reception mode switching unit 24 to produce a single signal with high stability. The produced signal is converted to a video signal and an audio signal through the first demultiplexer 14 and the video/audio decoder 15, and then the video signal and the audio signal are outputted by the video output unit 16 and the audio output unit 17 respectively. The single tuner mode does not use the second demultiplexer 25.

In the double tuner mode, the first tuner 12 selects a physical channel to be viewed designated by the channel selection controller 19, and demodulates a broadcast signal of the selected physical channel. The demodulated signal is converted to a video signal and an audio signal through the first demultiplexer 14 and the video/audio decoder 15, and the video signal and the audio signal are outputted by the video output unit 16 and the audio output unit 17 respectively. While the first tuner 12 performs the channel selection for program viewing, the second tuner 22 performs a channel scan to sequentially select the plurality of physical channels according to an instruction from the reception mode switching unit 24. At this time, the second tuner 22 outputs the reception result to the channel scan controller 26 and the second demultiplexer 25. The second demultiplexer 25 performs a demultiplexing process on the signal from the second tuner 22, and outputs the processing result to the channel scan controller 26. The channel scan by the second tuner 22 is carried out in parallel with the channel selection for program viewing by the first tuner 12 without being noticed by the viewer (or carried out behind program viewing), and is referred to as a 'background channel scan.' Hereinafter, only when the above channel scan needs to be distinguished from the other normal channel scan, the above channel scan will be referred to as the 'background channel scan,' and otherwise, the above channel scan and the normal channel scan will be collectively referred to as 'channel scan.'

While the channel scan controller 26 controls the second tuner 22 to perform a channel scan to sequentially select the plurality of physical channels, the channel scan controller 26 judges, for each of the physical channels, whether the physical channel can be received and thereby detects receivable physical channels. For example, the channel scan controller 26 instructs the reception mode switching unit 24 to switch to the double tuner mode and thereby detects receivable physical channels in the background channel scan. The channel scan controller 26 may perform the channel scan while no channel selection for program viewing is performed. The timing of performing the channel scan may be determined accordingly. For example, the channel scan is performed every predetermined time period (e.g., 15 minutes) or when an instruction is made by the user.

Furthermore, the digital broadcast receiver 1 includes, as a section regarding receivable area information, a current position detector 31, a movement direction detector 32, a broadcast area map storage unit (or an area information storage unit) 33, a reception information storage unit 34, and a broadcast area map generator (or an area information updating unit) 35.

The current position detector 31 detects a current position of the mobile body or the digital broadcast receiver 1. In the example of FIG. 1, the current position detector 31 detects a current position of the mobile body on the basis of a signal from an antenna for current position detection (e.g., a GPS antenna) 31a.

The movement direction detector 32 detects a movement direction of the mobile body or the digital broadcast receiver 1. For example, the movement direction detector 32 determines the movement direction on the basis of a history of the position detected by the current position detector 31. Specifically, the movement direction detector 32 determines a vector from a position detected at a predetermined time point in the past to the current position as the movement direction.

The broadcast area map storage unit 33 stores, for each physical channel, receivable area information indicating a receivable area, which is a region where the physical channel can be received. In this example, the receivable area is represented by a polygon, and the receivable area information includes polygon information for specifying the polygon representing the receivable area. In addition to the polygon information, the receivable area information includes information indicating a broadcast station corresponding to the physical channel, information indicating an affiliated station and a relay station of the broadcast station, and channel selection information for selecting the broadcast station. Information stored in the broadcast area map storage unit 33 is generated and updated by the broadcast area map generator 35. Initial information of the receivable area information may be record in the broadcast area map storage unit 33 in advance. The receivable area is also referred to as 'broadcast area map', and the entire information stored in the broadcast area map storage unit 33 will be referred to as 'broadcast area map information' in the description below.

The receivable area and the broadcast area map information will be described below with reference to drawings.

Figure 2:
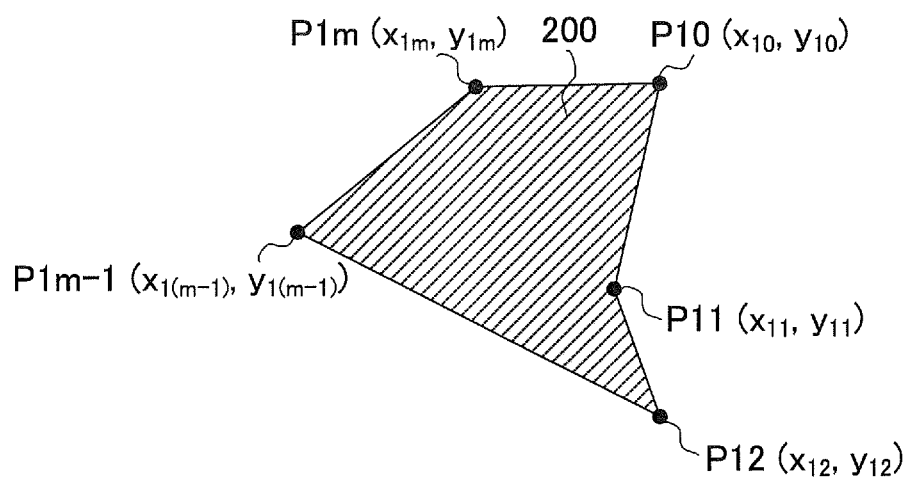
FIG. 2 is a diagram illustrating an example of a receivable area indicated by receivable area information in the first embodiment.

FIG. 2 is a diagram illustrating an example of a receivable area indicated by receivable area information.

In FIG. 2, a region 200 hatched by oblique lines represents a receivable area of a broadcast service for which a broadcast station A transmits a broadcast signal with a transport stream name (TS name) of 'EEEE'. A physical channel '13ch' is assigned to the broadcast station A, and the region 200 is a receivable area of the broadcast station A and also a receivable area of the physical channel '13ch'.

As illustrated in FIG. 2, a shape of a receivable area is represented by a polygon, and the receivable area of the broadcast station A is a region inside a polygon obtained by connecting m (where m is an integer not less than 3) vertexes: P10 (x10, y10), P11 (x11, y11), P12 (x12, y12), . . . , and P1m (x1m, y1m) in this order by sides, and connecting the vertex P1m (x1m, y1m) and the vertex P10 (x10, y10) by a side.

FIG. 3 is a diagram illustrating an example of the broadcast area map information stored in the broadcast area map storage unit 33 in a table form.

In FIG. 3, broadcast area map information 300 includes receivable area information 301, 302, . . . for respective physical channels. The receivable area information for each physical channel includes a physical channel number (or physical CH), a network name, a TS name, a service name, a vertex list (or polygon information), an unconnected vertex list, a physical channel number of a relay station (or relay station CH), and a physical channel number of an affiliated station (or affiliated station CH). In the description below, of the receivable area information, information other than the vertex list and the unconnected vertex list will be referred to as 'broadcast station information'.

In this example, the digital broadcast receiver 1 is a receiver that receives a Japanese terrestrial digital television broadcast and that conforms to the ARIB standard. The network name, the TS name, and the service name are specified in the ARIB standard. In the ARIB standard, a physical channel is assigned in units of networks, and a single network is assigned to a single broadcast station. Therefore, physical channels and networks are in one-to-one correspondence, and networks and broadcast stations are in one-to-one correspondence. The digital broadcast receiver 1 can recognize a broadcast station as a transmission source of a broadcast signal from a network name. The ARIB operational guidelines for digital terrestrial television broadcasting specifies that a single network transmits a broadcast signal of a single TS name.

In the vertex list, coordinates of respective vertexes of a polygon representing a receivable area are recorded in an order by which the polygon can be uniquely specified. In this example, the coordinates of the respective vertexes are recorded in the clockwise order of the polygon. For example, in the vertex list of the receivable area information 301 for the physical channel '13ch' (or the broadcast station A) in FIG. 3, the coordinates of the respective vertexes of the receivable area 200 illustrated in FIG. 2 are recorded in the clockwise order of the receivable area 200. Coordinates of a vertex is represented by an orthogonal coordinate system having longitude as an X-coordinate and latitude as a Y-coordinate. A vertex recorded at the head of the vertex list may be determined in an appropriate manner, and is, for example, a vertex having the smallest X-coordinate value, a vertex having the smallest Y-coordinate value, or a vertex whose position vector making the smallest angle with the positive part of the Y-coordinate axis, the position vector being a vector from the origin of the orthogonal coordinate system to the vertex. The order in which the coordinates are recorded in the vertex list is not limited to the clockwise order, and may be the counter-clockwise order. The shape of the receivable area may be represented in a manner other than the above.

In the unconnected vertex list, coordinates of two points connected to each other, or coordinates of one unconnected point not connected to another point are recorded. Points recorded in the unconnected vertex list form no polygon at present, but can be connected to other points to form a polygon in future.

In columns of a relay station CH and an affiliated station CH for each physical channel, physical channel numbers of a relay station and an affiliated station of a broadcast station corresponding to the physical channel are recorded respectively. In FIG. 3, in the receivable area information 301 for the physical channel '13ch' (or the broadcast station A), '20ch' and '32ch' are recorded as physical channel numbers of relay stations of the broadcast station A, and '25ch' is recorded as a physical channel number of an affiliated station of the broadcast station A.

In the example of FIG. 3, a single TS name is recorded with respect to a single physical channel, and a single service name is recorded with respect to a single TS name. However, plural TS names may be recorded with respect to a single physical channel, and plural service names may be recorded with respect to a single TS name.

Information indicating a TS or a service is not limited to name thereof, and may be any information identifying the TS or the service. For example, numerical information, such as a TS identifier (or TS_ID) or a service identifier (or SV_ID) may be employed.

In the broadcast area map information, information other than the above that can be obtained from a broadcast wave or signal may be further recorded. For example, broadcast service information concerning broadcast contents may be recorded.

Information included in the broadcast area map information is not limited to the above, and may be changed appropriately according to broadcast standards. Examples of digital broadcast standard include Integrated Services Digital Broadcasting-Terrestrial (ISDB-T), Digital Video Broadcasting-Terrestrial (DVB-T), Digital Video Broadcasting-Handheld (DVB-H), Digital Terrestrial Multimedia Broadcast (DTMB), Advanced Television Systems Committee (ATSC), Digital Audio Broadcast (DAB), Digital Audio Broadcast plus (DAB+), Digital Multimedia Broadcasting (DMB), and China Mobile Multimedia Broadcasting (CMMB). For ISDB-T, DVB-T, DVB-H, DTMB, and ATSC, a TS name is recorded as shown in FIG. 3. For DAB, DAB+, and DMB, information indicating an ensemble, such as an ensemble name, may be recorded instead of a TS name. For CMMB, information indicating a multiplex frame (MF) may be recorded instead of a TS name and information indicating a multiplex sub-frame (MSF) may be recorded instead of a service name.

The broadcast area map information is used to automatically switch from a physical channel being viewed to another physical channel currently providing the same program as a program being viewed, when a reception state of the physical channel being viewed is deteriorated due to a movement of the mobile body or the like.

Specifically, when the channel selection controller 19 judges that a reception state of a currently viewed physical channel is deteriorated (or the reception becomes impossible), the channel selection controller 19 refers to the broadcast area map information and searches for an alternative physical channel that has a high possibility of providing the same program as the currently viewed program provided by the currently viewed physical channel and that can be received at the current position. If such an alternative physical channel is found, the channel selection controller 19 controls the first tuner 12 to select the alternative physical channel. Examples of the physical channel that has a high possibility of providing the same program as the currently viewed program include a physical channel of a relay station or an affiliated station of the currently viewed broadcast station, and a physical channel providing a service having the same service name as the currently viewed service. Thus, from a viewpoint of realizing a quick automatic switching of channels, it is desirable to record information indicating a physical channel of a relay station or an affiliated station or information indicating a service such as a service name in the broadcast area map information.

More specifically, the channel selection controller 19 is notified of information for acquiring a reception state as follows. The channel selection controller 19 receives, from the first tuner 12, C/N, a bit-error rate, phase locked loop (PLL) lock information of the tuner, orthogonal frequency division multiplexing (OFDM) frame lock information, or the like. The channel selection controller 19 receives, from the first demultiplexer 14, a notification of disruption of section data (e.g., Program Specific Information (PSI)/Service Information (SI) information), or the like. The channel selection controller 19 receives, from the video/audio decoder 15, information on decoding error rate, or the like. Based on the notified information, when the channel selection controller 19 judges that a reception state of the currently viewed broadcast signal is deteriorated, the channel selection controller 19 refers to the broadcast area map information and searches for a broadcast station (e.g., a relay station or an affiliated station) or a service that has a high possibility of broadcasting the same program as the currently viewed program and that can be received at the current position. If such a broadcast station or service is found, the channel selection controller 19 obtains channel selection information for the broadcast station or service from the broadcast area map information, and selects the broadcast station or service by using the obtained channel selection information.

Referring to FIG. 1 again, the reception information storage unit 34 stores, for each physical channel, reception information indicating a position of the mobile body when the channel scan controller 26 judges that the physical channel can be received, a signal intensity of a broadcast signal of the physical channel when the channel scan controller 26 judges that the physical channel can be received, and a date and time when the channel scan controller 26 judges that the physical channel can be received.

Figure 4:
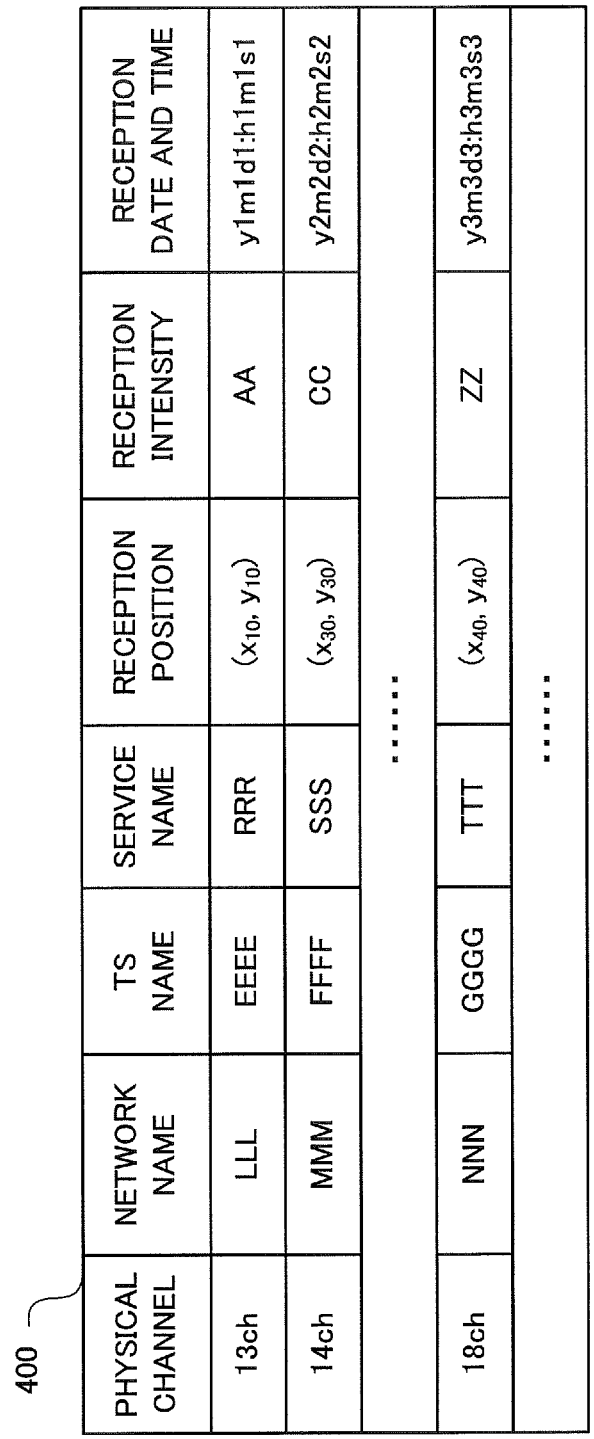
FIG. 4 is a diagram illustrating an example of a reception information table stored in a reception information storage unit in the first embodiment.

FIG. 4 is a diagram illustrating an example of a reception information table stored in the reception information storage unit 34. In the reception information table 400 of FIG. 4, for each physical channel, a physical channel number (physical CH), a network name, a TS name (or ensemble name), a service name, a reception position, a reception intensity, and a reception date and time are recorded. The information in the reception information table 400 is used as information at the time of the previous reception in updating of receivable area information, as described later.

When the channel scan controller 26 judges in a channel scan that a physical channel can be received (i.e., when a receivable physical channel is detected in a channel scan), the broadcast area map generator 35 updates the receivable area information of the physical channel stored in the broadcast area map storage unit 33 so as to extend the receivable area indicated by the receivable area information. The process of updating receivable area information will be referred to as the 'extension update process', and described later in more detail.

When the channel scan controller 26 judges in a channel scan that a physical channel can be received, the broadcast area map generator 35 updates the broadcast station information of the physical channel according to information obtained from a broadcast signal of the physical channel by the second tuner 22 or the second demultiplexer 25 in the channel scan. For example, the broadcast area map generator 35 updates the network name, the TS name, the service name, the physical channel number of the relay station (relay station CH), and the physical channel number of the affiliated station (affiliated station CH), according to section data (e.g., PSI/SI information) obtained from the broadcast signal.

Moreover, when the channel scan controller 26 judges that a physical channel can be received, if receivable area information of the physical channel is already stored in the broadcast area map storage unit 33, the broadcast area map generator 35 updates the receivable area information, and if not, the broadcast area map generator 35 newly generates receivable area information of the physical channel and stores the generated receivable area information in the broadcast area map storage unit 33.

Furthermore, when the channel scan controller 26 judges that a physical channel can be received, the broadcast area map generator 35 performs the extension update process of the receivable area information of the physical channel, and then updates the reception information of the physical channel stored in the reception information storage unit 34. At this time, in the reception information table, the reception point is updated to a current position detected by the current position detector 31 at the reception judgment, the reception intensity is updated to a signal intensity detected by the second signal intensity detector 23 at the reception judgment, and the reception date and time is updated to a date and time at the reception judgment.

The extension update process of receivable area information by the broadcast area map generator 35 will be described below.

When the channel scan controller 26 judges in a channel scan that a physical channel can be received, the broadcast area map generator 35 determines, as a receivable position, a position apart from the current position detected by the current position detector 31 in the movement direction detected by the movement direction detector 32 according to the signal intensity of the broadcast signal of the physical channel detected by the second signal intensity detector 23, and updates the receivable area information for the physical channel stored in the broadcast area map storage unit 33 so as to extend the receivable area indicated by the receivable area information to the receivable position. However, if the determined receivable position is within the receivable area indicated by the existing receivable area information, the broadcast area map generator 35 may perform no extension of the receivable area. The broadcast area map generator 35 may be configured not to perform extension of the receivable area if the current position is within the receivable area indicated by the existing receivable area information.

In this embodiment, when it is judged that a physical channel can be received, the broadcast area map generator 35 determines an extension distance according to the signal intensity of the broadcast signal of the physical channel, determines a first position apart from the current position in the movement direction by the extension distance as the receivable position. Specifically, when it is judged that a physical channel can be received, the broadcast area map generator 35 refers to the reception information for the physical channel stored in the reception information storage unit 34 and determines the extension distance according to a difference between the signal intensity detected by the second signal intensity detector 23 at this time and the signal intensity detected at the previous or immediately preceding time (specifically, the signal intensity detected when the channel scan controller 26 previously judged that the physical channel can be received). However, the broadcast area map generator 35 may determine the extension distance according to only the signal intensity detected at this time, and may determine the extension distance to be greater as the signal intensity detected at this time is higher.

Moreover, when updating the receivable area information, the broadcast area map generator 35 updates the vertex list (polygon information) so as to enlarge the polygon specified by the vertex list. In this case, the polygon after the enlargement is a polygon obtained by combining an additional polygon having a vertex at the receivable position with the polygon before the enlargement. The additional polygon is a polygon formed by two sides connecting the receivable position and two vertexes of the polygon before the enlargement and at least one side of the polygon before the enlargement. In this example, the broadcast area map generator 35 determines a threshold distance according to the signal intensity detected by the second signal intensity detector 23, and if the vertexes of the polygon before the enlargement include two or more vertexes whose distance from the receivable position is less than the threshold distance, determines the two vertexes from among the two or more vertexes. Specifically, vertexes at both ends of the two or more vertexes are determined as the two vertexes. However, the two vertexes of the polygon before the enlargement connected to the receivable position may be determined in other manners. For example, two vertexes closest to the receivable position of the vertexes of the polygon before the enlargement may be selected.

Figure 5:
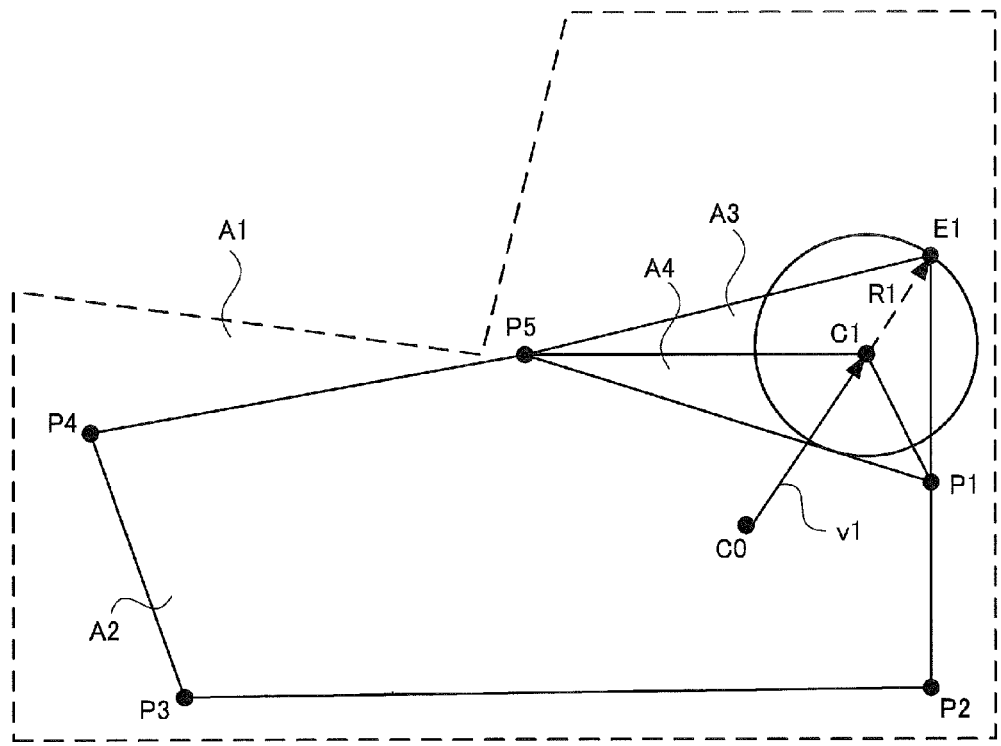
FIG. 5 is a diagram for explaining a specific example of an extension update process of receivable area information by a broadcast area map generator in the first embodiment.

FIG. 5 is a diagram for explaining a specific example of the extension update process of receivable area information by the broadcast area map generator 35. A specific example of the extension update processing of receivable area information will be described below with reference to FIG. 5.

In FIG. 5, an inverted L-shaped region A1 represents a region where a broadcast signal of a broadcast station B can be actually received, that is, an actual receivable area of the broadcast station B. A pentagonal region A2 specified by vertexes P1 to P5 represents a receivable area indicated by receivable area information before update for the broadcast station B. Thus, in the vertex list of the receivable area information before update for the broadcast station B, the vertexes P1, P2, P3, P4, and P5 are recorded in this order. A point C1 represents a current position of the mobile body. It is assumed that a channel scan at this time is performed at the current position C1 and the broadcast station B is detected as a receivable broadcast station. A point C0 represents a previous reception position, which is a position where the broadcast station B was previously or last detected as a receivable broadcast station in a channel scan. Coordinates of the previous reception position C0, a signal intensity of the broadcast station B at the position C0, and a date and time of the channel scan at the position C0 are recorded in the reception information table.

When the broadcast station B is detected as a receivable broadcast station in the channel scan at the current position C1, the broadcast area map generator 35 obtains a signal intensity SI1 of the broadcast station B at the current position C1 and determines a threshold distance δ according to the signal intensity SI1. The threshold distance δ is determined so as to be greater as the signal intensity SI1 is higher.

Next, the broadcast area map generator 35 compares the signal intensity SI1 of the broadcast station B at the current position C1 with the signal intensity SI0 of the broadcast station B at the previous reception position C0 and judges whether or not the signal intensity at the current position C1 is higher than that at the previous reception position C0, that is, whether or not the difference between the both signal intensities ΔSI (=SI1−SI0) is greater than zero.

If the signal intensity at this time is higher than that at the previous time (i.e., ΔSI>0), the broadcast area map generator 35 determines an extension distance R1 according to the difference ΔSI. Specifically, the extension distance R1 is determined to be greater as the difference ΔSI is greater. The broadcast area map generator 35 obtains a vector v1 from the previous reception position C0 to the current position C1 as a movement direction of the mobile body. Then, the broadcast area map generator 35 determines, as a receivable position, a position E1 apart from the current position C1 in the direction of the vector v1 by the extension distance R1. The broadcast area map generator 35 extracts a vertex whose distance from the receivable position E1 is less than the threshold distance δ from among the vertexes P1 to P5 of the receivable area A2 before update. In this example, it is assumed that the distance P1E1<δ and the distance P5E1<δ, and the vertexes P1 and P5 are extracted. The broadcast area map generator 35 combines a triangular region A3 with the existing receivable area A2 to obtain a receivable area (A2+A3) after update. The triangular region A3 is formed by two sides P1E1 and P5E1 connecting the receivable position E1 with the extracted two vertexes P1 and P5 respectively and a side P1P5 of the receivable area A2 before update. The receivable area (A2+A3) after update is represented by a hexagon with vertexes P1 to P5 and E1. Therefore, in the vertex list in the receivable area information for the broadcast station B, the new vertex E1 is added and the vertexes P1, P2, P3, P4, P5, and E1 are recorded in this order.

On the other hand, if the signal intensity at this time is lower than or equal to that at the previous time (i.e., ΔSI≤0), the broadcast area map generator 35 determines the current position C1 as a receivable position. Then, the broadcast area map generator 35 extracts a vertex whose distance from the receivable position C1 is less than the threshold distance δ from among the vertexes P1 to P5 of the receivable area A2 before update. In this example, it is assumed that the distance P1C1<δ and the distance P5C1<δ, and the vertexes P1 and P5 are extracted. Next, the broadcast area map generator 35 combines a triangular region A4 with the existing receivable area A2 to obtain a receivable area (A2+A4) after update. The triangular region A4 is formed by two sides P1C1 and P5C1 connecting the receivable position C1 with the extracted two vertexes P1 and P5 respectively and a side P1P5 of the receivable area A2 before update. The receivable area (A2+A4) after update is represented by a hexagon with vertexes P1 to P5 and C1. Therefore, in the vertex list in the receivable area information for the broadcast station B, the new vertex C1 is added and the vertexes P1, P2, P3, P4, P5, and C1 are recorded in this order.

Further, the extension update process in other cases will be described below with reference to FIGS. 6 to 8.

Figure 6:
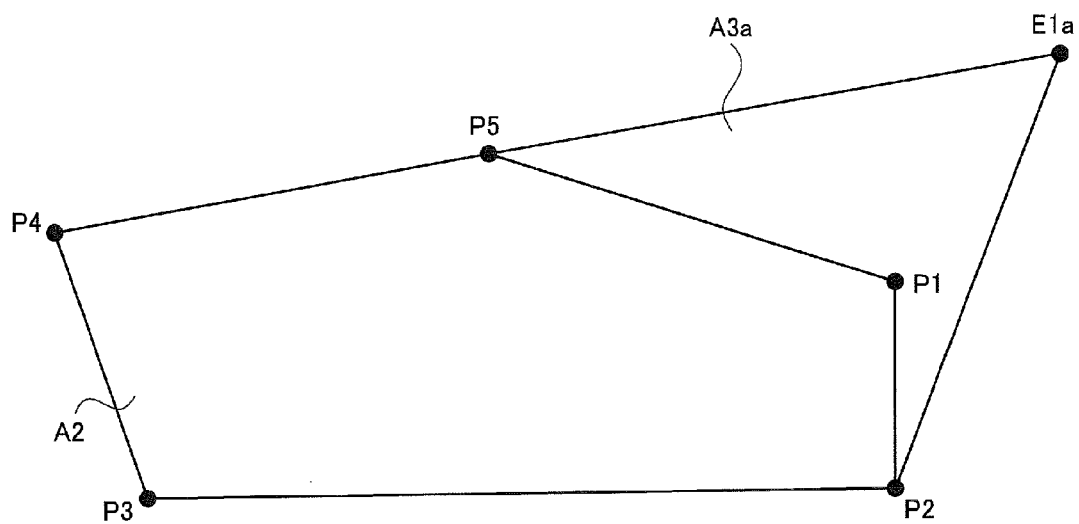
FIG. 6 is a diagram for explaining another specific example of the extension update process of receivable area information by the broadcast area map generator in the first embodiment.
Figure 7:
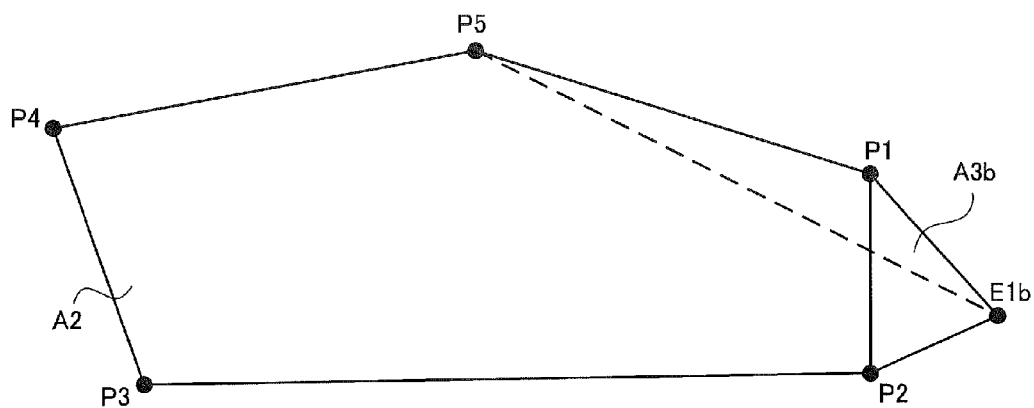
FIG. 7 is a diagram for explaining another specific example of the extension update process of receivable area information by the broadcast area map generator in the first embodiment.
Figure 8:
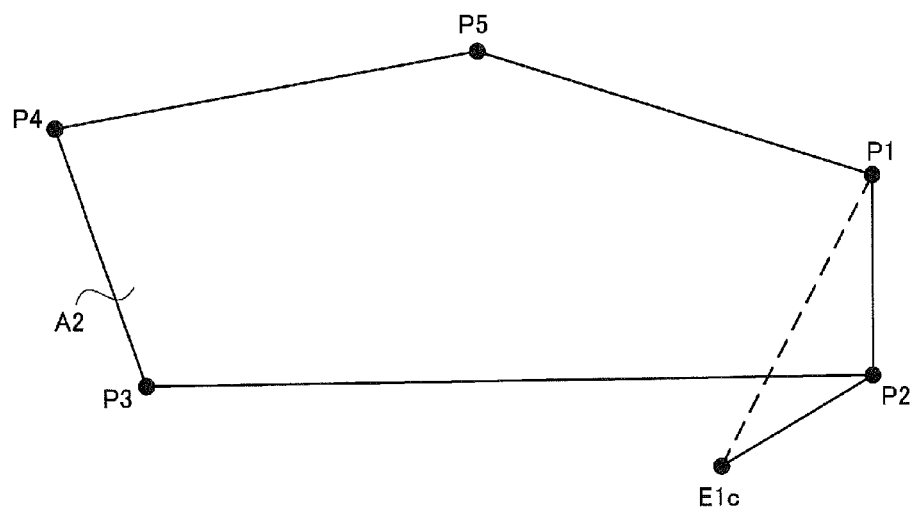
FIG. 8 is a diagram for explaining another specific example of the extension update process of receivable area information by the broadcast area map generator in the first embodiment.

In each of FIGS. 6 to 8, similarly to FIG. 5, a pentagonal region A2 specified by vertexes P1 to P5 represents a receivable area indicated by receivable area information before update for a broadcast station B.

In FIG. 6, it is assumed that a point E1a is determined as a receivable position, and the vertexes P1, P2, and P5 are each extracted as a vertex whose distance from the receivable position E1a is less than the threshold distance δ. In this case, the broadcast area map generator 35 combines a polygonal region A3a with the receivable area A2 before update to obtain a receivable area (A2+A3a) after update. The polygonal region A3a is formed by two sides P2E1a and P5E1a and sides P1P2 and P1P5 of the receivable area A2 before update. The two sides P2E1a and P5E1a connect the receivable position E1a with vertexes P2 and P5 at both ends of the three vertexes P1, P2, and P5, respectively. The receivable area (A2+A3a) after update is represented by a pentagon with vertexes P2 to P5 and E1a. Therefore, in the vertex list in the receivable area information for the broadcast station B, the new vertex E1a is added, the vertex P1 which is included in the receivable area after update is deleted, and the vertexes P2, P3, P4, P5, and E1a are recorded in this order.

In FIG. 7, it is assumed that a point E1b is determined as a receivable position, and the vertexes P1, P2, and P5 are each extracted as a vertex whose distance from the receivable position E1b is less than the threshold distance δ. In this case, the broadcast area map generator 35 excludes the vertex P5 from the extracted three vertexes P1, P2, and P5, since a line segment E1bP5 (broken line) intersects a side of the existing receivable area A2. Then, the broadcast area map generator 35 combines a polygonal region A3b with the receivable area A2 before update to obtain a receivable area (A2+A3b) after update. The polygonal region A3b is formed by two sides P1E1b and P2E1b connecting the receivable position E1b with the remaining two vertexes P1 and P2 respectively and a side P1P2 of the receivable area A2 before update. The receivable area (A2+A3*b*) after update is represented by a hexagon with vertexes P1 to P5 and E1*b*. Therefore, in the vertex list in the receivable area information for the broadcast station B, the new vertex E1*b* is added, and the vertexes P1, E1*b*, P2, P3, P4, and P5 are recorded in this order.

In FIG. 8, it is assumed that a point E1*c* is determined as a receivable position, and the vertexes P1 and P2 are each extracted as a vertex whose distance from the receivable position E1*c* is less than the threshold distance δ. In this case, the broadcast area map generator 35 excludes the vertex P1 from the extracted two vertexes P1 and P2, since a line segment E1*c*P1 (broken line) intersects a side of the existing receivable area A2. Therefore, only one vertex remains. In such a case, the broadcast area map generator 35 does not extend the receivable area, but adds the vertex E1*c* to the unconnected vertex list.

Figure 9:
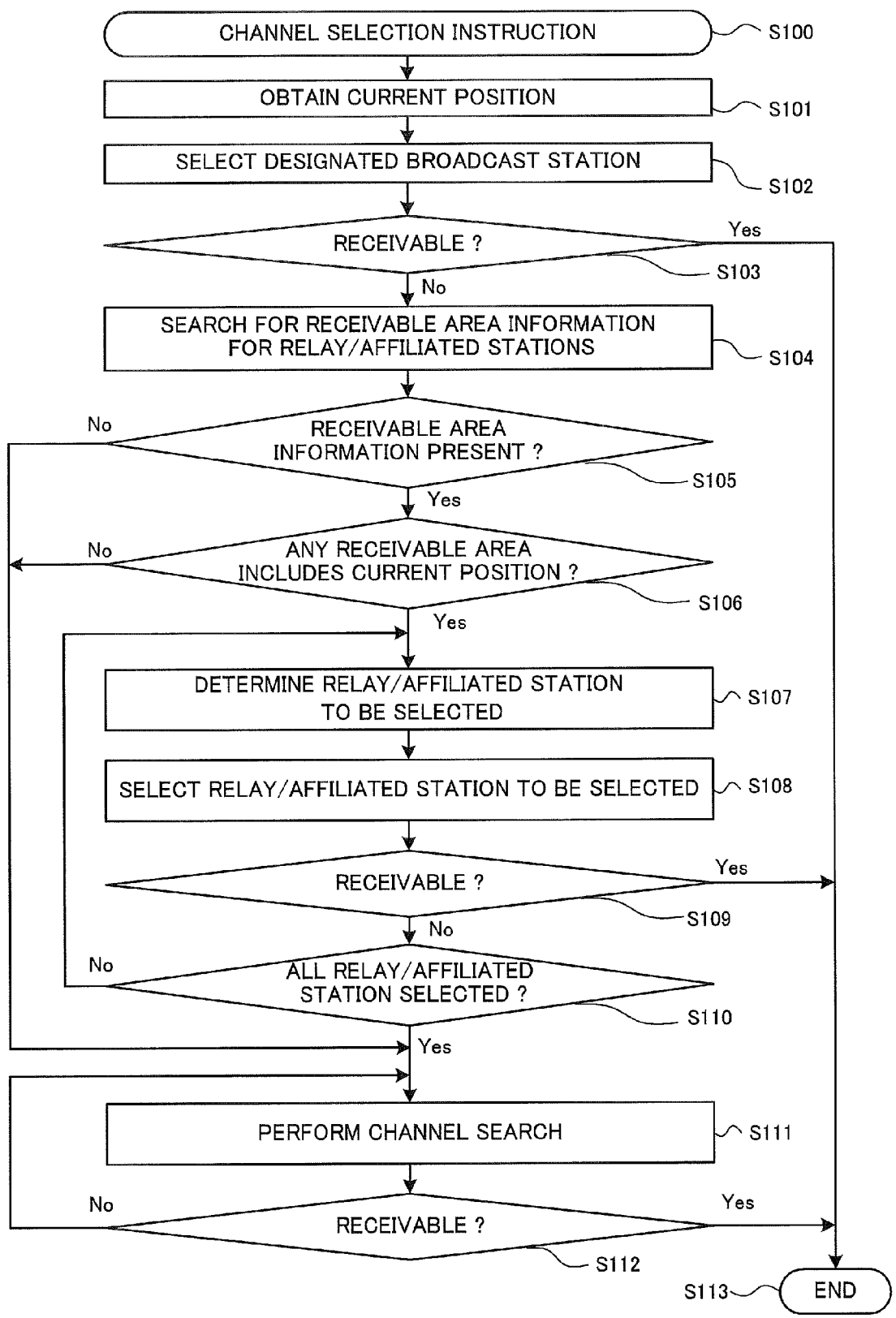
FIG. 9 is a flowchart illustrating a process of a channel selection operation in the first embodiment.

FIG. 9 is a flowchart illustrating a process of a channel selection operation in the digital broadcast receiver 1 in the first embodiment. In the description below, when it is not necessary to distinguish between a relay station and an affiliated station, they will be correctively referred to as a 'relay/affiliated station'.

When the channel selection controller 19 receives a channel selection instruction from a user through the operation input unit 18 (S100), the channel selection controller 19 obtains a current position from the current position detector 31 (S101), controls the first tuner 12 to select a broadcast station designated by the channel selection instruction (S102), and checks whether or not the broadcast station can be received (S103). If it can be received (Yes in step S103), the channel selection controller 19 ends the process (S113), and the designated broadcast station is viewed. Since the current position information obtained in step S101 includes an observation error due to antenna performance in reality, a value after the decimal point of the current position information may be rounded down, for example.

If the designated broadcast station cannot be received (No in step S103), the channel selection controller 19 searches the broadcast area map information stored in the broadcast area map storage unit 33 for receivable area information for relay/affiliated stations of the designated broadcast station (S104), and checks whether or not there is receivable area information for relay/affiliated stations (S105). If no such receivable area information is found (No in step S105), the channel selection controller 19 starts a channel search described later (S111).

If receivable area information for relay/affiliated stations is found (Yes in step S105), the channel selection controller 19 checks whether or not one or more receivable areas including the current position obtained in step S101 are recorded in the found receivable area information for relay/affiliated stations (S106). If no such area is found (No in step S106), the channel selection controller 19 starts a channel search described later (S111). Since the obtained current position includes an observation error due to antenna performance in reality, in step S106, the channel selection controller 19 may judge whether or not the current position is included within a range of a several meters from an outer circumference of a receivable area, instead of strictly judging whether or not the current position is included within a receivable area.

If one or more receivable areas including the current position are found (Yes in step S106), the channel selection controller 19 determines, as a broadcast station to be selected, a broadcast station most likely to be receivable of one or more relay/affiliated stations corresponding to the found receivable areas including the current position (S107). At this time, for example, the channel selection controller 19 obtains, for each of the found receivable areas including the current position, a distance between a centroid position of the receivable area and the current position, and determines a relay/affiliated station corresponding to a receivable area having the smallest distance as the broadcast station most likely to be receivable.

Next, the channel selection controller 19 selects the broadcast station to be selected determined in step S107 (S108) and checks whether or not the broadcast station can be received (S109). If it can be received (Yes in step S109), the channel selection controller 19 ends the process (S113), and the broadcast station after the channel selection switching is viewed.

If the broadcast station to be selected cannot be received (No in step S109), the channel selection controller 19 checks whether or not all of the relay/affiliated stations corresponding to the found receivable areas including the current position have already been selected (S110). If this is so (Yes in step S110), the channel selection controller 19 starts a channel search (S111). If not (No in step S110), the process returns to step S107, and the channel selection controller 19 determines, as a broadcast station to be selected, a broadcast station most likely to be receivable of one or more unselected relay/affiliated stations corresponding to the found receivable areas including the current position (S107), and then selects the broadcast station to be selected (S108).

In step S111, the channel selection controller 19 performs, by using the first tuner 12, a channel search to sequentially select the physical channels to detect a broadcast station that is a relay/affiliated station of the designated broadcast station and that can be received (or can be viewed) at the current position. If a receivable relay/affiliated station is detected in the channel search (Yes in step S112), the channel selection controller 19 ends the process (S113), and the broadcast station after the channel selection switching is viewed. On the other hand, if no receivable relay/affiliated station is detected after all of the physical channels are selected in the channel search (No in step S112), the channel selection controller 19 starts a new channel search (S111).

It is noted that if no receivable relay/affiliated station is detected after all of the physical channels are selected in the channel search, the channel selection controller 19 may inform the user that no broadcast station is found and then select a predetermined alternative broadcast station, instead of starting a new channel search. The alternative broadcast station is a broadcast station that can be received that has the smallest physical channel number, or the most recently viewed broadcast station, for example. Alternatively, the channel selection controller 19 may wait for another operation from the user without performing selection of an alternative broadcast station after terminating the channel search.

In the channel search in step S111, an order of the channel selection is, for example, an ascending or descending order of the physical channel numbers. In this case, the order may be changed so as to preferentially select all of the relay/affiliated stations of the designated broadcast station. In this case, furthermore, by giving priority to the relay/affiliated stations, the relay/affiliated stations may be selected in a descending order of the priority. For example, the priority is given by using a positional relationship between the current position and receivable areas recorded in receivable area information of the relay/affiliated stations. Examples of this method include a method of giving a higher priority as a distance between the current position and a vertex closest to the current position of vertexes of a receivable area is smaller, a method of giving a higher priority as a distance between the current position and a side closest to the current position of sides of a receivable area is smaller, and a method of giving a higher priority as a distance between the current position and a centroid position of a receivable area is smaller. However, other methods may be used.

Figure 10:
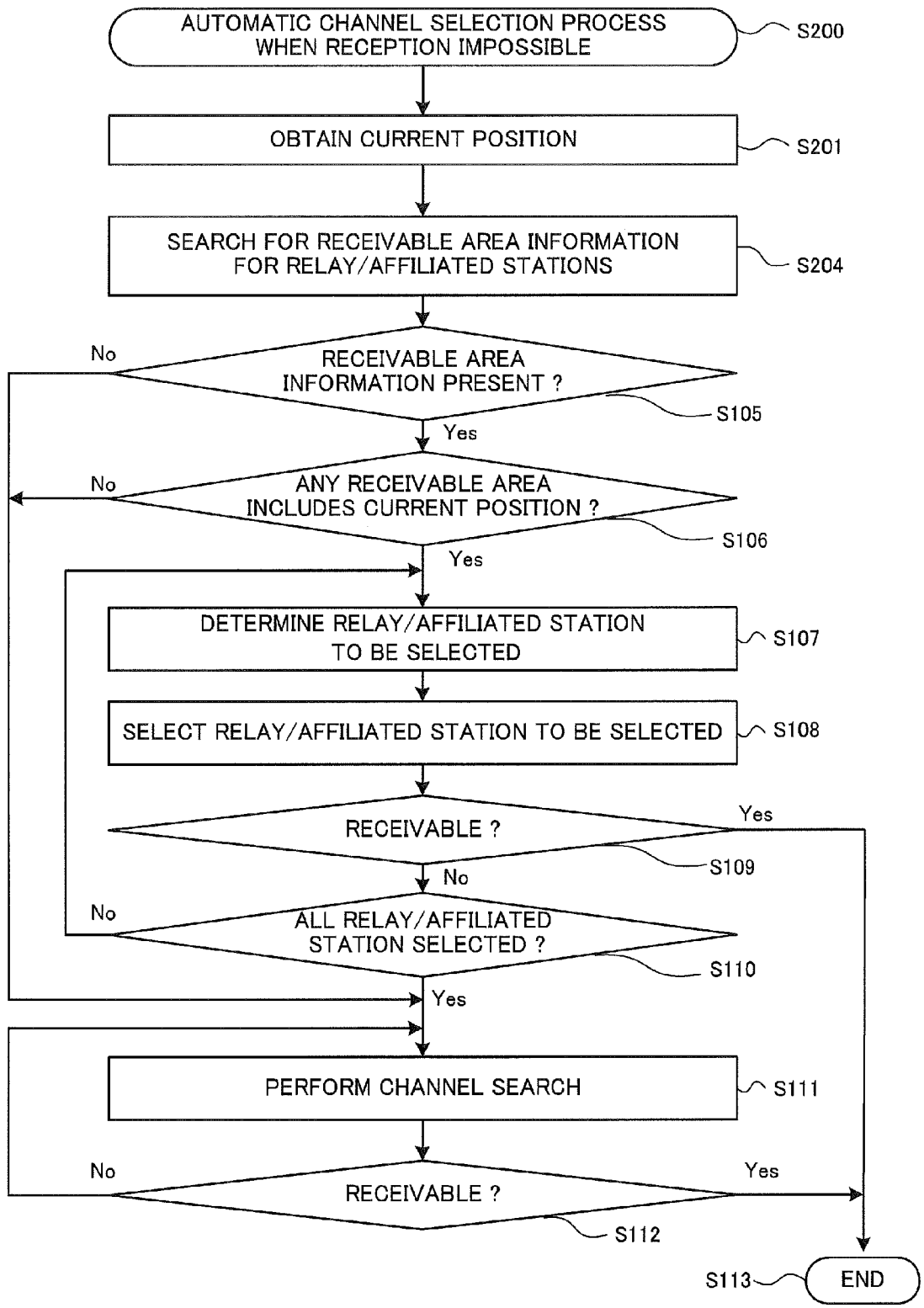
FIG. 10 is a flowchart illustrating an automatic channel selection process when a broadcast station being selected becomes unreceivable in the first embodiment.

FIG. 10 is a flowchart illustrating an automatic channel selection process performed by the digital broadcast receiver 1 in the first embodiment when a broadcast station being selected becomes unreceivable.

When the channel selection controller 19 receives from the first tuner 12 a notification that a broadcast station being selected cannot be received, or when it detects that a reception signal from the first tuner 12 is stopped, the channel selection controller 19 starts the automatic channel selection process (S200) and obtains a current position from the current position detector 31 (S201). The process in step S201 is the same as that in step S101 in FIG. 9. Then, the channel selection controller 19 searches the broadcast area map information stored in the broadcast area map storage unit 33 for receivable area information of relay/affiliated stations of the broadcast station that has become unreceivable (S204). The process in step S204 is the same as that in step S104 in FIG. 9, except that the search is performed on the basis of the broadcast station that has become unreceivable instead of the broadcast station designated by the channel selection instruction. After step S204, the process proceeds to step S105.

Processes in step S105 and subsequent steps in FIG. 10, which is the same as those in step S105 and subsequent steps in FIG. 9, finds an alternative broadcast station that can be received at the current position and selects the alternative broadcast station. This allows the user to continue viewing.

The above described automatic channel selection process may be performed not only when a broadcast station being viewed becomes unreceivable, but also when it is expected that a broadcast station being viewed will soon become unreceivable, for example. Specifically, when the channel selection controller 19 detects, based on a relationship between the current position and a receivable area indicated by receivable area information of the broadcast station being viewed, that the current position is near the boundary of the receivable area and detects, based on a history of changes in the current position, that a movement direction of the mobile body is directed toward the outside of the receivable area, the channel selection controller 19 may expect that the broadcast station being viewed will soon become unreceivable, and then perform the automatic channel selection process to switch a broadcast station to be selected.

Figure 11:
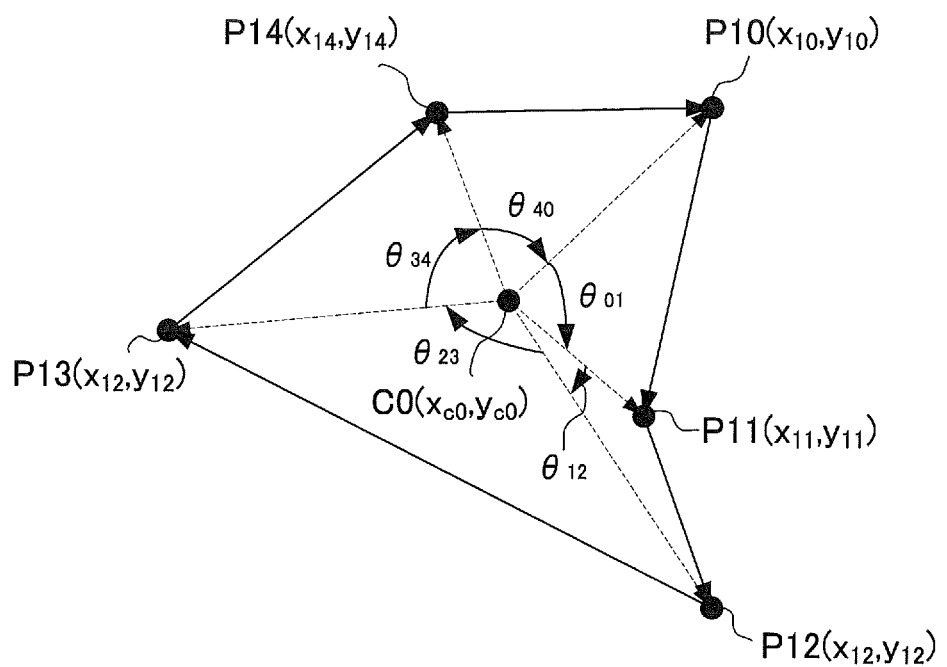
FIG. 11 is a diagram illustrating an example of a positional relationship between a current position and a receivable area in the first embodiment.

FIG. 11 is a diagram illustrating an example of a positional relationship between a current position and a receivable area. A specific example of a process for judging whether or not the current position is included in the receivable area in step S106 in FIGS. 9 and 10 will be described below with reference to FIG. 11.

Five vectors from the current position C0 to respective vertexes P10 to P14 of the receivable area are defined, and angles θ01, θ12, θ23, θ34, and θ40 made by each adjacent two vectors of the five vectors are obtained. For example, in obtaining the angle θ01 made by P10, C0, and P11, an inner product and an outer product of a vector from C0 to P10 and a vector from C0 to P11 are determined. Any of a tangent, a sine, and a cosine are determined from the inner product and the outer product, and thus a value of the angle θ01 is obtained. All of the angles θ01, θ12, θ23, θ34, and θ40 thus obtained are summed up, and it is judged whether or not the current position C0 is inside the receivable area depending on whether or not the resulting sum is equal to 360°.

More specifically, for example, in obtaining the angle θ01, regarding the vector from C0 to P10 and the vector from C0 to P11, an inner product value a given as $((x_{10}-x_{c0}) \times (x_{11}-x_{c0}) +$ $(y_{10}-y_{c0}) \times (y_{11}-y_{c0}))$ and an outer product value β given as $((x_{10}-x_{c0}) \times (y_{11}-y_{c0}) \times (x_{11}-x_{c0}) \times (y_{10}-y_{c0}))$ are determined, and then α/β is calculated to determine the tangent. Further, a length L010 from C0 to P10 and a length L011 from C0 to P11 are calculated. Then, the sine can be determined by calculating α/(L010×L011) and the cosine can be determined by calculating β/(L010×L011). By applying an inverse function to any of the calculated tangent, sine, and cosine, two angles within a range of 0° to 360° are determined as candidate values of the angle θ01. Depending on positive or negative signs of the inner product α and the outer product β, it can be determined which angle range the angle θ01 is within as follows. If α and β are both positive, the angle θ01 is within a range of 0° to 90°. If α is positive and β is negative, the angle θ01 is within a range of 90° to 180°. If α and β are both negative, the angle θ01 is within a range of 180° to 270°. If α is negative and β is positive, the angle θ01 is within a range of 270° to 360°. According to this determination, one of the two candidate values is determined as the angle θ01. Similarly, the other angles θ12, θ23, θ34, and θ40 are determined. In this manner, the angle θ01 made by the current position C0 and the vertexes P10 and P11, the angle θ12 made by the current position C0 and the vertexes P11 and P12, the angle θ23 made by the current position C0 and the vertexes P12 and P13, the angle θ34 made by the current position C0 and the vertexes P13 and P14, and the angle θ40 made by the current position C0 and the vertexes P14 and P10 are determined. Then, all of the determined angles are summed up. By judging whether or not the resulting sum is equal to 360°, it can be judged whether or not the current position is inside the receivable area.

Figure 12:
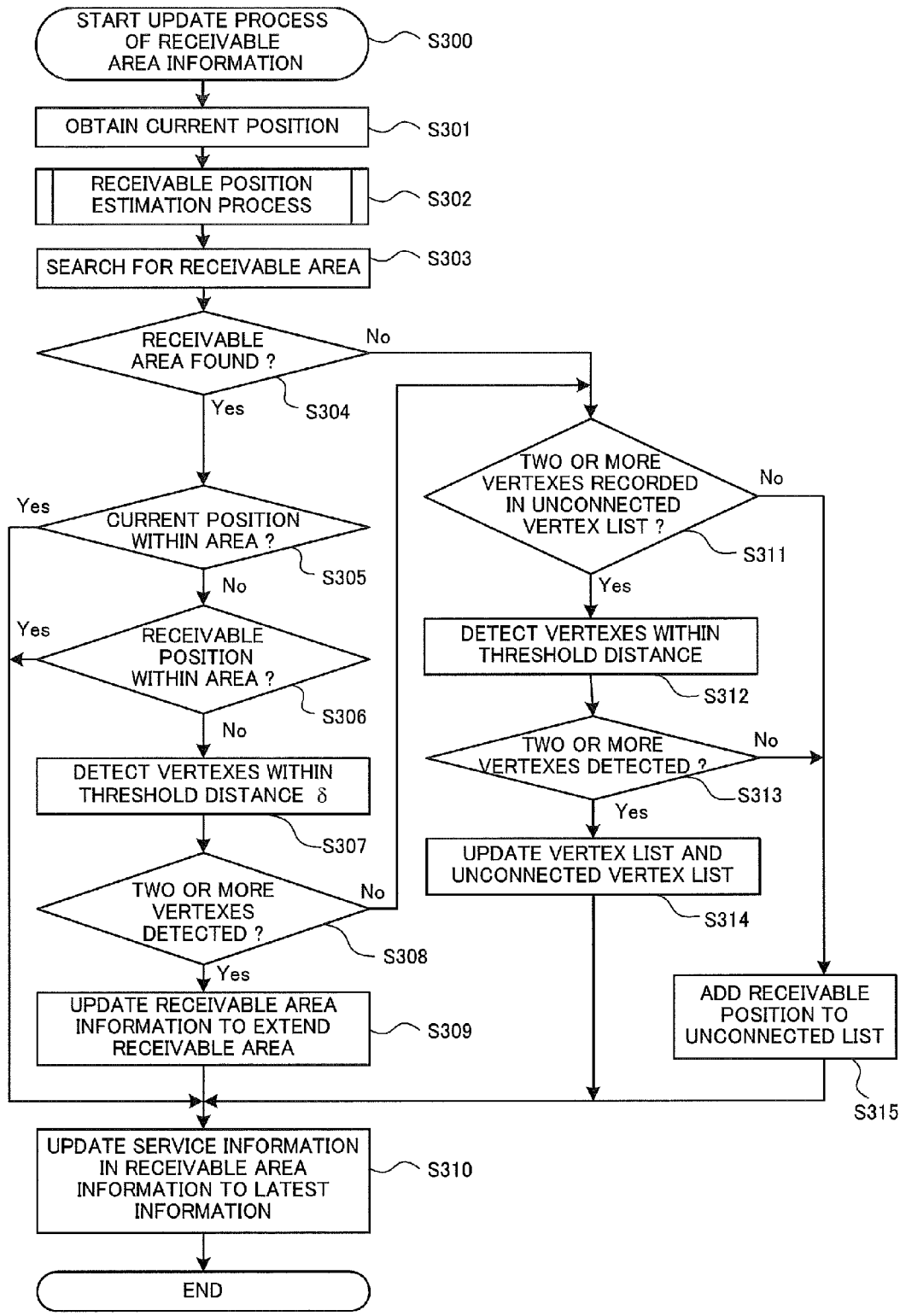
FIG. 12 is a flowchart illustrating an update process of broadcast area map information in the first embodiment.

FIG. 12 is a flowchart illustrating an update process of the broadcast area map information in the digital broadcast receiver 1 in the first embodiment.

The channel scan controller 26 controls the second tuner 22 and the second demultiplexer 25 so that a channel scan is carried out independently of or in parallel with a channel selection for program viewing by the first tuner 12, and thereby detects a physical channel that can be received.

In this example, it is assumed that a broadcast station C is detected in the channel scan as a broadcast station that can be received. An update process of receivable area information of the broadcast station C will be described with reference to FIG. 12.

When receiving from the channel scan controller 26 a notification that the broadcast station C is detected in the channel scan, the broadcast area map generator 35 starts an updating process of receivable area information of the broadcast station C (S300).

The broadcast area map generator 35 obtains a current position from the current position detector 31 (S301).

Figure 13:
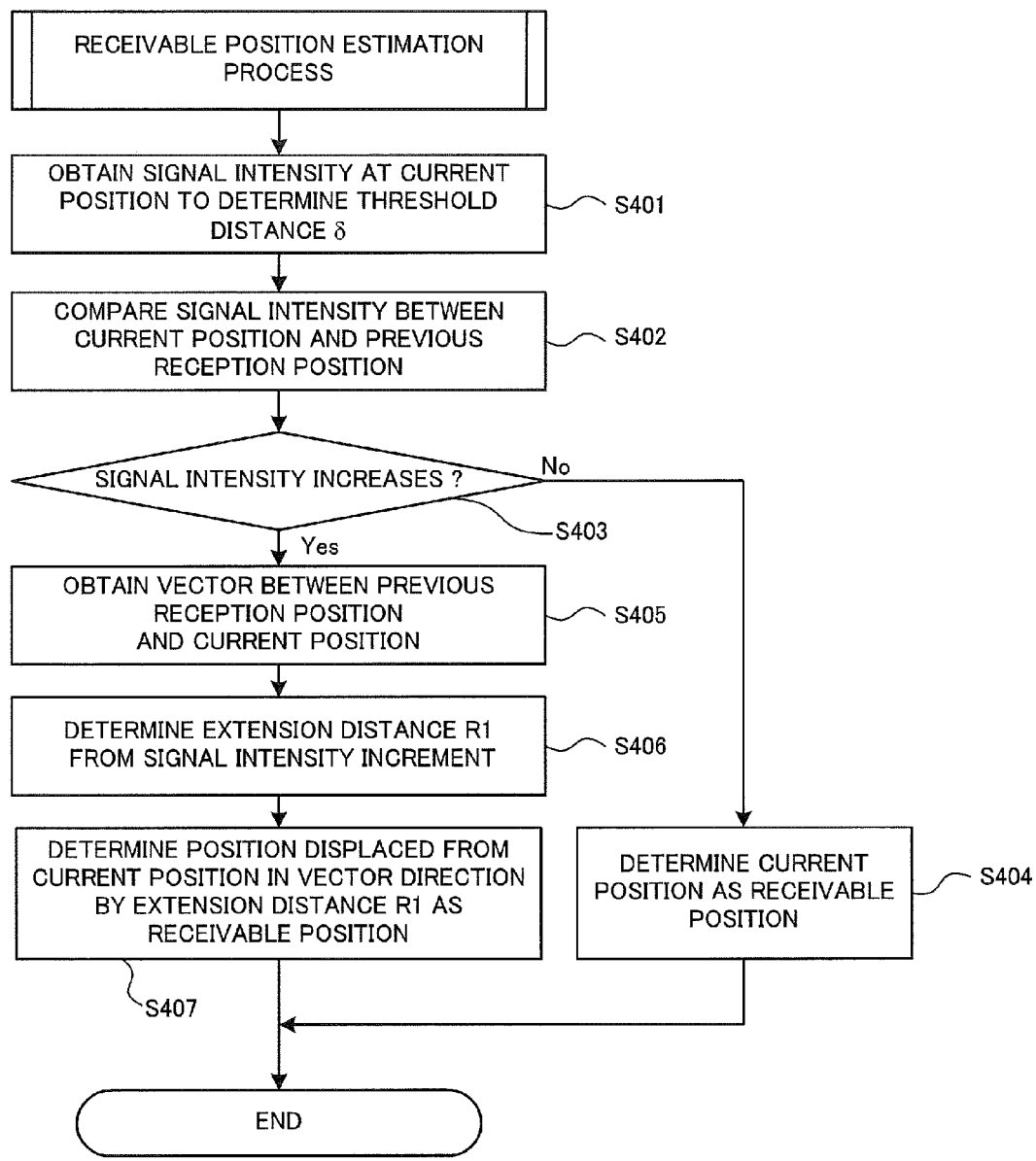
FIG. 13 is a flowchart illustrating a receivable position estimation process in the first embodiment.

Next, the broadcast area map generator 35 performs a receivable position estimation process illustrated in FIG. 13 to determine a receivable position (S302).

In FIG. 13, the broadcast area map generator 35 obtains a signal intensity of a broadcast signal of the broadcast station C from the second signal intensity detector 23, and determines a threshold distance δ corresponding to the signal intensity (S401). For example, the broadcast area map generator 35 refers to a table indicating a correspondence between several levels of the signal intensity and values of the threshold distance, and determines a value corresponding to a level of the signal intensity of the broadcast station C as the threshold distance δ. However, a value of the threshold distance δ may be determined in other manners.

Next, the broadcast area map generator 35 refers to the reception information table and compares the signal intensity of the broadcast station C at the previous reception position and the signal intensity of the broadcast station C at the current position (S402). If the signal intensity at the current position is lower than or equal to that at the previous reception position (No in step 403), the broadcast area map generator 35 determines the current position as the receivable position (S404) and ends the receivable position estimation process.

If the signal intensity at the current position is higher than that at the previous reception position (Yes in step S403), the broadcast area map generator 35 refers to the reception information table, obtains a vector from the previous reception position to the current position as a movement direction (S405), and determines an extension distance (or radius) R1 on the basis of an amount of increase in the signal intensity form the previous reception (S406). The extension distance R1 is determined so as to be greater as the amount of increase in the signal intensity is greater. The broadcast area map generator 35 determines a position displaced from the current position in the vector direction by the extension distance R1 as the receivable position (S407), and ends the receivable position estimation process. For example, an intersection point of a circle having a center at the current position and a radius of R1 and a half line extending from the current position in the vector direction is determined as the receivable position.

Returning to FIG. 12, after the receivable position is determined in step S302, the broadcast area map generator 35 searches the broadcast area map storage unit 33 for a receivable area corresponding to the broadcast station C (S303), and judges whether or not a receivable area of the broadcast station C is recorded (S304). At this time, if receivable area information of the broadcast station C is present and vertexes of a polygon are recorded in the vertex list in the receivable area information, it is judged that a receivable area is recorded. On the other hand, if no receivable area information of the broadcast station C is present, or if receivable area information of the broadcast station C is present but no vertexes of a polygon are recorded in the vertex list in the receivable area information, it is judged that no receivable area is recorded.

If a receivable area of the broadcast station C is recorded (Yes in step S304), the broadcast area map generator 35 judges whether or not the current position is within the receivable area of the broadcast station C (S305). If the current position is not within the receivable area (No in step S305), the broadcast area map generator 35 further judges whether or not the receivable position is within the receivable area (S306). If at least one of the current position and the receivable position is within the receivable area (Yes in step S305 or Yes in step S306), the process proceeds to step S310. If neither the current position nor the receivable position is within the receivable area (No in step S305 and No in step S306), the process proceeds to step S307.

In step S307, the broadcast area map generator 35 detects a vertex whose distance from the receivable position is less than the threshold distance δ determined in step S401 from among vertexes recorded in the vertex list in the receivable area information of the broadcast station C. For example, the broadcast area map generator 35 detects vertexes included inside a circle having a center at the receivable position and a radius of δ. In the process of step S307, of the vertexes recorded in the vertex list, a vertex making with the receivable position a line segment intersecting a side of the receivable area of the broadcast station C (e.g., the vertex P5 in FIG. 7 and the vertex P1 in FIG. 8) is excluded from the detection.

Next, the broadcast area map generator 35 judges whether or not two or more vertexes are detected in step S307 (S308).

If two or more vertexes are detected (Yes in step S308), the broadcast area map generator 35 updates the receivable area information of the broadcast station C so as to extend the receivable area (S309). Specifically, defining two line segments connecting vertexes at both ends of the detected two or more vertexes with the receivable position as new sides, the broadcast area map generator 35 combines the existing polygon with a polygon formed by the two new sides and at least one side clipped by the two new sides out of the sides of the existing polygon to determine a polygon after enlargement. Then, the broadcast area map generator 35 records vertexes of the polygon after enlargement in a clockwise order in the vertex list of the broadcast station C. At this time, the receivable position is added to the vertex list as a new vertex. A vertex of the existing polygon included inside the polygon after enlargement is deleted from the vertex list. After the extension process of the receivable area ends, the process proceeds to step S310.

In step S310, the broadcast area map generator 35 updates the broadcast station information included in the receivable area information of the broadcast station C to the latest information obtained from a broadcast signal of the broadcast station C in the channel scan, and ends the process.

In step S304, if it is judged that no receivable area of the broadcast station C is recorded (No in step S304), or if two or more vertexes are not detected (No in step S308), the broadcast area map generator 35 judges whether or not two or more vertexes different from the receivable position are already recorded in the unconnected vertex list of the broadcast station C (S311). If it is judged that two or more vertexes are not already recorded (No in step S311), the broadcast area map generator 35 adds the receivable position to the unconnected vertex list of the broadcast station C (S315). At this time, if one vertex different from the receivable position is already recorded in the unconnected vertex list and a distance from the receivable position to the one vertex is less than the threshold distance δ, the receivable position may be added so as to be connected with the one vertex. Next, the broadcast area map generator 35 updates the broadcast station information included in the receivable area information of the broadcast station C to the latest information obtained from a broadcast signal of the broadcast station C in the channel scan (S310), and ends the process. However, in step S310, if there is no receivable area information of the broadcast station C, the broadcast area map generator 35 newly generates receivable area information of the broadcast station C by using information obtained from a broadcast signal of the broadcast station C in the channel scan, and stores the generated receivable area information in the broadcast area map storage unit 33.

In step S311, if it is judged that two or more vertexes different from the receivable position are already recorded in the unconnected vertex list (Yes in step S311), the broadcast area map generator 35 detects, from among the two or more vertexes, a vertex whose distance from the receivable position is less than the threshold distance δ determined in step S401 (S312), and judges whether or not two or more such vertexes are detected (S313). If two or more such vertexes are not detected (No in step S313), the broadcast area map generator 35 adds the receivable position to the unconnected vertex list of the broadcast station C (S315). At this time, if there is one vertex whose distance from the receivable position is less than the threshold distance δ in the unconnected vertex list, the receivable position may be added so as to be connected with the one vertex. Next, the broadcast area map generator 35 updates the broadcast station information included in the receivable area information of the broadcast station C to the latest information obtained from a broadcast signal of the broadcast station C in the channel scan (S310), and ends the process.

In step S313, if it is judged that two or more vertexes are detected (Yes in step S313), the broadcast area map generator 35 updates the vertex list and the unconnected vertex list of the broadcast station C (S314). Specifically, it is judged whether or not there are two vertexes connected with each other in the detected two or more vertexes, and if not, the receivable position is recorded in the unconnected vertex list so as to be connected with each of the detected two or more vertexes. On the other hands, if there are two vertexes connected with each other, a triangle formed by the two vertexes and the receivable position is newly recorded in the vertex list of the broadcast station C or is combined with the existing polygon recorded in the vertex list of the broadcast station C. Accordingly, the two vertexes are deleted from the unconnected vertex list. After step S314, the broadcast area map generator 35 updates the broadcast station information included in the receivable area information of the broadcast station C to the latest information obtained from a broadcast signal of the broadcast station C in the channel scan (S310), and ends the process.

As described above, the digital broadcast receiver in the first embodiment determines, when the channel scan controller judges that a physical channel can be received, a position apart from the current position in the movement direction according to the signal intensity of a broadcast signal of the physical channel as a receivable position, and updates the receivable area information so as to extend the receivable area indicated by the receivable area information to the receivable position. Thus, according to this embodiment, the receivable area indicated by the receivable area information can be efficiently extended. Specifically, the receivable area can be extended to a position that the mobile body has not actually reached, and thereby can be extended more efficiently in comparison with a configuration that extends a receivable area to the current position. As a result, for example, in a configuration that searches for, when a physical channel being viewed becomes unreceivable, an alternative physical channel receivable at the current position with reference to receivable area information and selects the alternative physical channel, an alternative physical channel can be detected and selected more quickly. Moreover, an alternative physical channel becomes more likely to be found from the receivable area information before a channel search, which selects all the physical channels, is performed, and a frequency of performance of the channel search when the reception becomes impossible decreases. Thereby, a time period of program viewing under diversity reception can be increased.

Moreover, although a region to which the mobile body has never been is added to the receivable area not depending on a result of a channel scan in an actual movement, since a receivable area is extended based on a signal intensity and a movement state, it is possible to generate receivable area information indicating a receivable area with a small difference from an actual receivable area. Thus, for example, in a configuration that searches for, when a physical channel being viewed becomes unreceivable, an alternative physical channel receivable at the current position with reference to receivable area information and selects the alternative physical channel, an alternative physical channel can be detected and selected appropriately. Specifically, if a receivable area indicated by receivable area information is wider than an actual receivable area, a relay/affiliated station that cannot be actually received at the current position is erroneously recognized as a relay/affiliated station that can be received at the current position, and an ineffective selection of a relay/affiliated station occurs. According to this embodiment, since receivable area information with a small difference from an actual receivable area can be generated, it is possible to reduce such an ineffective selection of a relay/affiliated station, select a relay/affiliated station that can be actually received at the current position, and reduce a time period during which a program cannot be viewed.

Furthermore, since a receivable area is extended in a movement direction of the mobile body, a receivable area can be extended in a direction in which the mobile body is likely to move in the future, which is efficient. Useful receivable area information can be generated.

Figure 14:
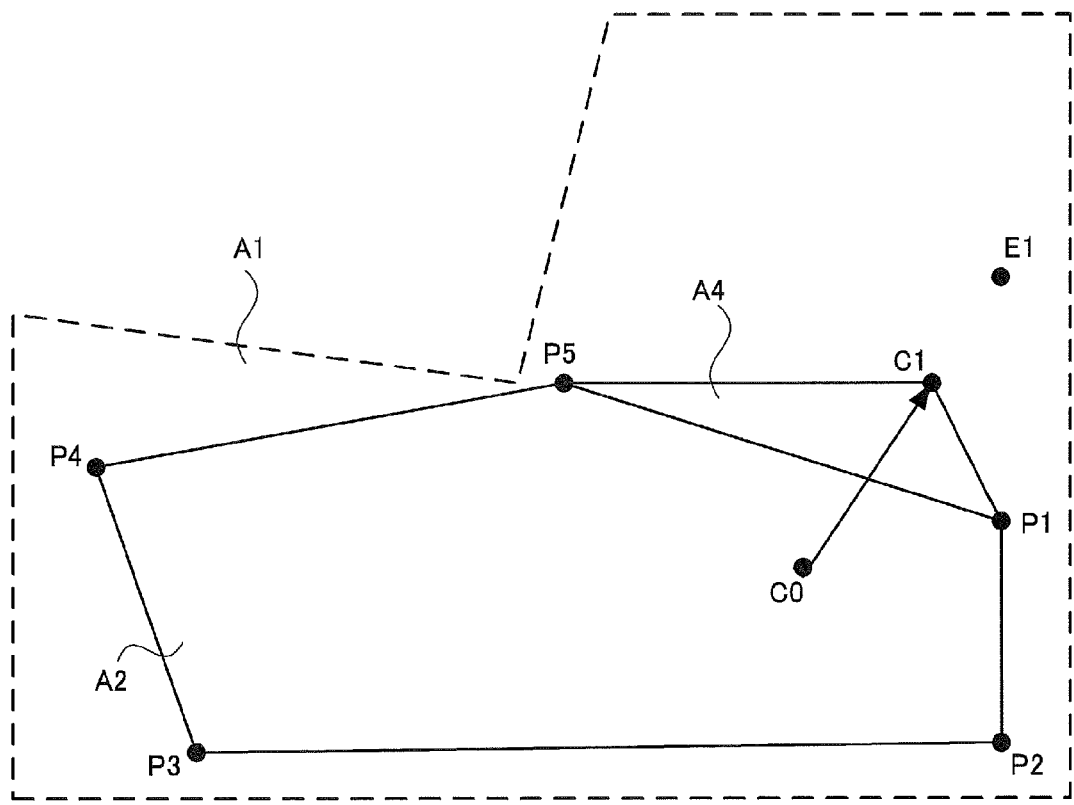
FIG. 14 is a diagram for explaining an extension update process of receivable area information in a comparative example.

FIG. 14 is a diagram for explaining an extension update process of receivable area information in a comparative example. Similarly to FIG. 5, FIG. 14 illustrates an actual receivable area A1 of a broadcast station B, a receivable area A2 indicated by receivable area information before update for the broadcast station B, a current position C1, and a previous reception position C0.

A digital broadcast receiver in the comparative example is configured to update, when a broadcast station that can be received is detected in a channel scan, receivable area information for the broadcast station so as to extend a receivable area indicated by the receivable area information to a current position.

When the broadcast station B is detected as a broadcast station that can be received in a channel scan at the current position C1, the digital broadcast receiver in the comparative example combines a triangular region A4 formed by the current position C1 and the existing vertexes P1 and P5 with the existing receivable area A2 to obtain a receivable area after update, which is a hexagonal region (A2+A4) specified by vertexes P1 to P5 and C1.

In the digital broadcast receiver in the comparative example, even if a signal intensity of the broadcast station B at the current position C1 is very high, the current position C1 is recognized to be an end of a receivable area. For this reason, a position where the broadcast station B can actually be received, such as a point E1, is determined to be out of a receivable area. This prolongs a time taken for automatic selection of a receivable broadcast station.

In comparison with the above comparative example, according to this embodiment, a difference between a receivable area indicated by receivable area information and an actual receivable area can be reduced, and a time taken for an automatic channel selection can be reduced. As a result, for example, diversity reception can be efficiently performed with fewer antennas.

Second Embodiment

Figure 15:
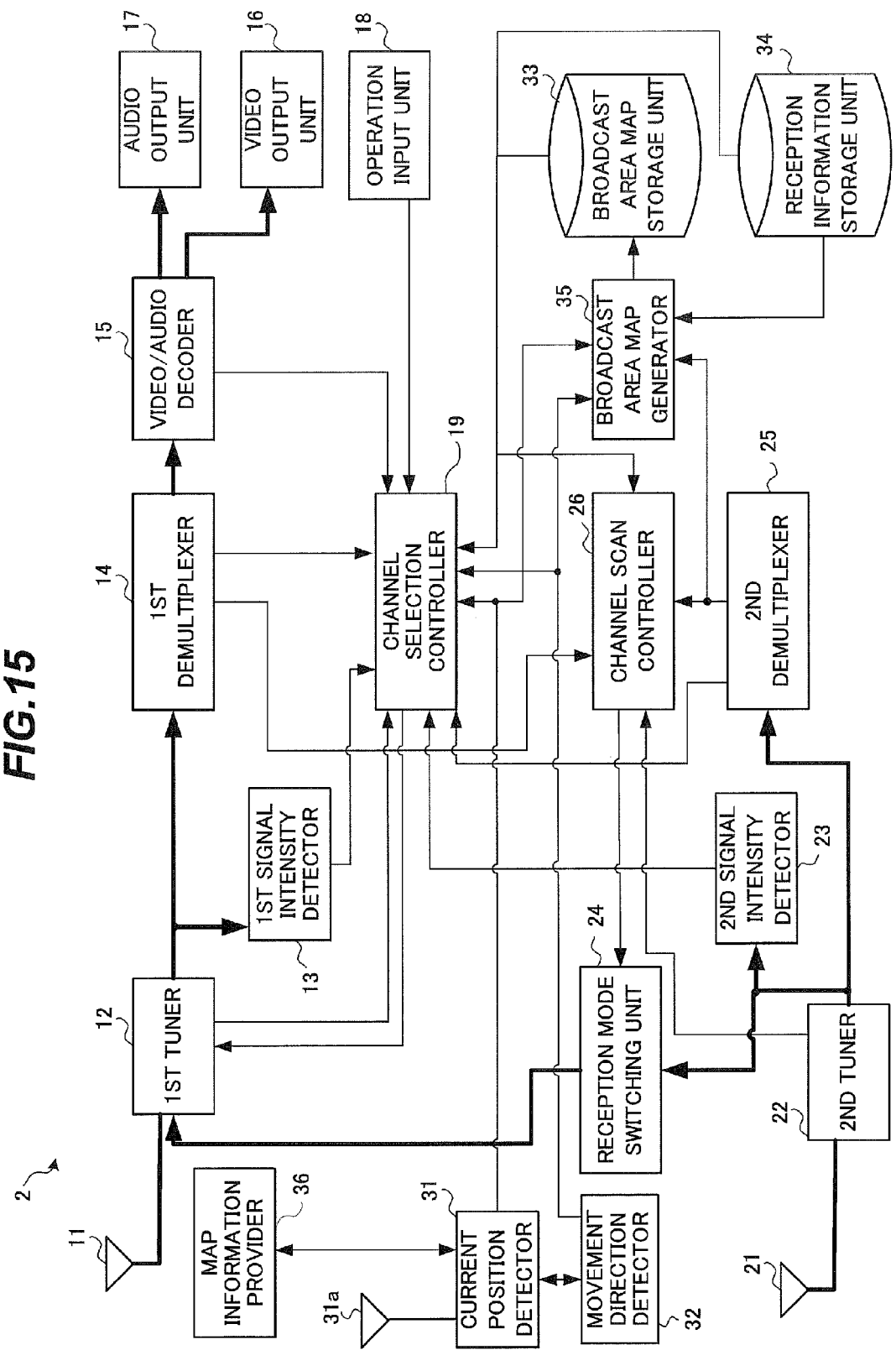
FIG. 15 is a block diagram schematically illustrating a configuration of a digital broadcast receiver according to a second embodiment.

FIG. 15 is a block diagram schematically illustrating a configuration of a digital broadcast receiver 2 in a second embodiment. The digital broadcast receiver 2 is similar to the digital broadcast receiver 1 in the first embodiment except that a receivable position is determined using map information. Descriptions of elements and processes that are the same as in the first embodiment will be omitted or simplified in the description below.

In FIG. 15, the digital broadcast receiver 2 includes a map information provider 36 in addition to the configuration of the digital broadcast receiver 1 illustrated in FIG. 1.

The map information provider 36 provides map information to the broadcast area map generator 35. The map information includes information indicating a position or size of an obstacle (e.g., a mountain or building) to a broadcast signal, and includes, for example, topographic information indicating topography. The map information provider 36 may be a part of the digital broadcast receiver 2 or may be provided outside the digital broadcast receiver 2. In this example, the map information provider 36 is a global positioning system (GPS) receiver such as a GPS navigator. The GPS receiver may be an external device connected by wire or wireless to the digital broadcast receiver 2, or may be integrated with the digital broadcast receiver 2. The GPS receiver may include the current position detector 31 or the antenna 31a for current position detection, and may provide current position information to the digital broadcast receiver 2. The map information provider 36 may be a GPS receiver built in a smartphone, and the digital broadcast receiver 2 may obtain information from the GPS receiver as an external input through a Bluetooth (registered trademark) connection or a Universal Serial Bus (USB) connection.

In this embodiment, the broadcast area map generator 35 obtains the map information from the map information provider 36, and determines the receivable position based on map information around the current position. Specifically, when the channel scan controller 26 judges that a physical channel can be received, the broadcast area map generator 35 determines an extension distance according to a signal intensity of a broadcast signal of the physical channel, and determines a first position apart from the current position in the movement direction by the extension distance. Then, the broadcast area map generator 35 judges based on the map information whether or not there is an object higher than a predetermined height between the current position and the first position. If it is judged that there is no object, the broadcast area map generator 35 determines the first position as the receivable position, and if it is judged that there is an object, it determines a position closer to the current position than the first position (i.e., a position displaced from the first position toward the current position) as the receivable position.

Figure 16:
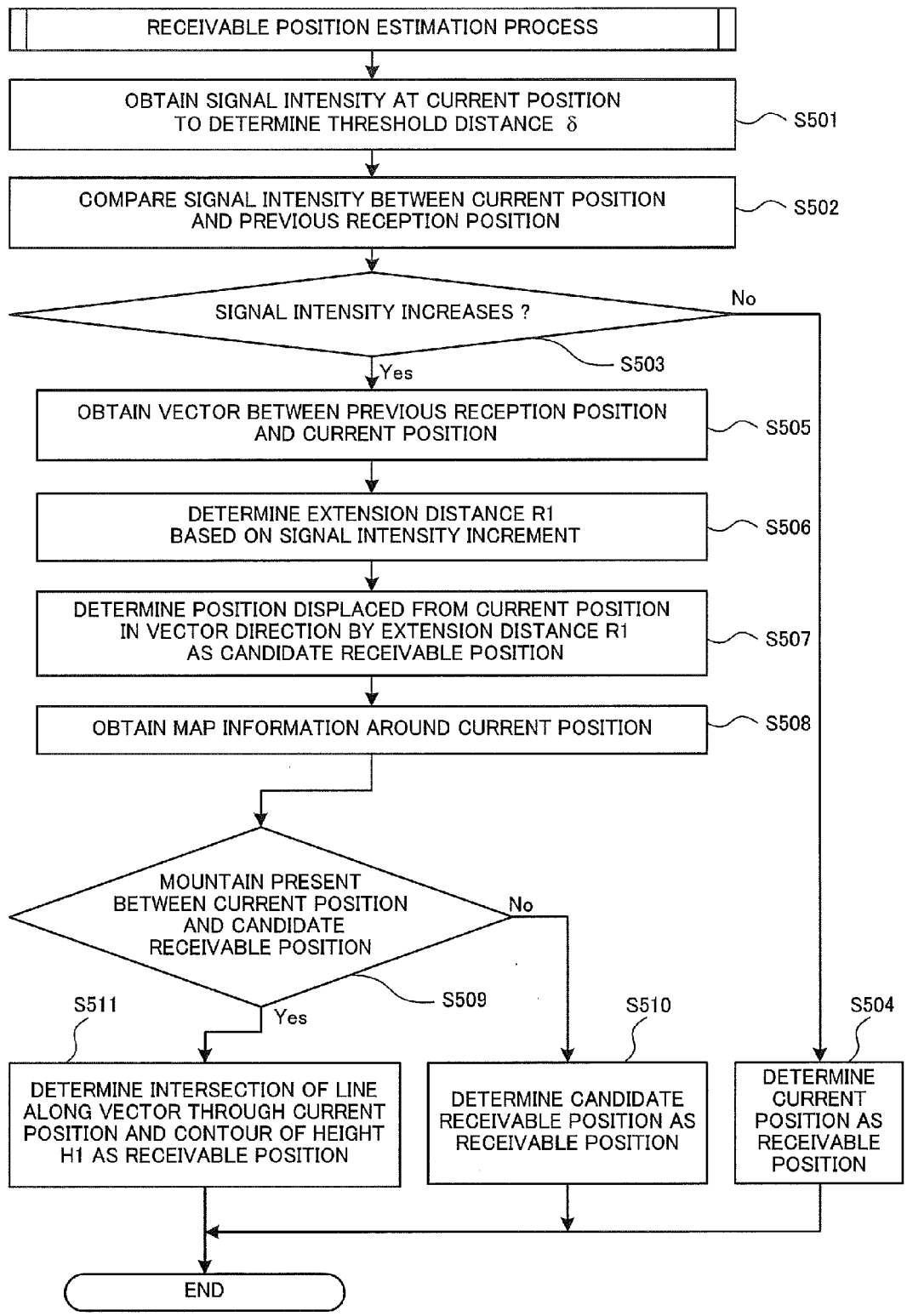
FIG. 16 is a flowchart illustrating a receivable position estimation process in the second embodiment.

FIG. 16 is a flowchart illustrating a receivable position estimation process in the second embodiment. The receivable position estimation process will be described below with reference to FIG. 16. In this example, it is assumed that a broadcast station C has been detected in a channel scan as a broadcast station that can be received.

Similarly to step S401 in FIG. 13, the broadcast area map generator 35 obtains a signal intensity of a broadcast signal of the broadcast station C from the second signal intensity detector 23, and determines a threshold distance δ according to the signal intensity (S501).

Next, the broadcast area map generator 35 refers to the reception information table and compares the signal intensity of the broadcast station C at the previous reception position and the signal intensity of the broadcast station C at the current position (S502). If the signal intensity at the current position is lower than or equal to that at the previous reception position (No in step 503), the broadcast area map generator 35 determines the current position as the receivable position (S504), and ends the receivable position estimation process.

If the signal intensity at the current position is higher than that at the previous reception position (Yes in step S503), the broadcast area map generator 35 obtains a vector from the previous reception position to the current position as a movement direction (S505) and determines an extension distance (or radius) R1 on the basis of an amount of increase in the signal intensity (S506), similarly to steps S405 and S406 in FIG. 13. Then, the broadcast area map generator 35 determines a position displaced from the current position in the vector direction by the extension distance R1 as a candidate receivable position (S507). For example, an intersection point of a circle having a center at the current position and a radius of R1 and a half line extending from the current position in the vector direction is determined as the candidate receivable position.

Next, the broadcast area map generator 35 obtains map information around the current position from the map information provider 36 (S508). For example, the broadcast area map generator 35 obtains map information of the inside of a circle having a center at the current position and a radius of R1 and the periphery of the circle.

Next, the broadcast area map generator 35 refers to the obtained map information and judges whether or not there is a mountain (or obstacle) higher than a predetermined height between the current position and the candidate receivable position (S509). In this example, if there is a point that is located above and between the current position and the candidate receivable position and whose height from the current position is not less than a predetermined threshold H, it is judged that there is a mountain higher than the predetermined height, and otherwise, it is judged that there is no such mountain. The predetermined threshold H is a threshold vale that is set in advance and corresponds to a height of mountain precluding the reception.

If there is no mountain higher than the predetermined height between the current position and the candidate receivable position (No in step S509), the broadcast area map generator 35 determines the candidate receivable position as the receivable position (S510), and ends the receivable position estimation process.

If there is a mountain higher than the predetermined height between the current position and the candidate receivable position (Yes in step S509), the broadcast area map generator 35 determines, as the receivable position, an intersection point closest to the current position of intersection points of a contour line of a height of H1 from the current position and a half line extending from the current position in the vector direction, (i.e., a point at which a height from the current position first reaches the height H1 when moving from the current position in the vector direction) (S511), and ends the receivable position estimation process. The height H1 is a threshold value that is set in advance and corresponds to a height of mountain not precluding the reception, and is, for example, set to a value not greater than the predetermined threshold H.

Figure 17:
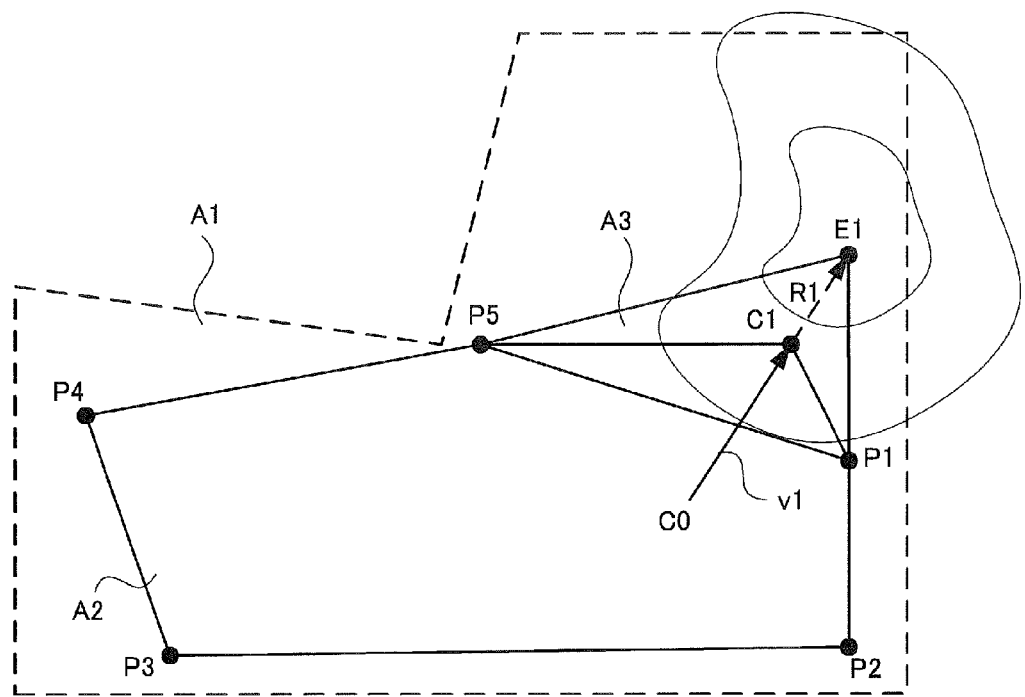
FIG. 17 is a diagram for explaining a specific example of an extension update process of receivable area information in the second embodiment.
Figure 18:
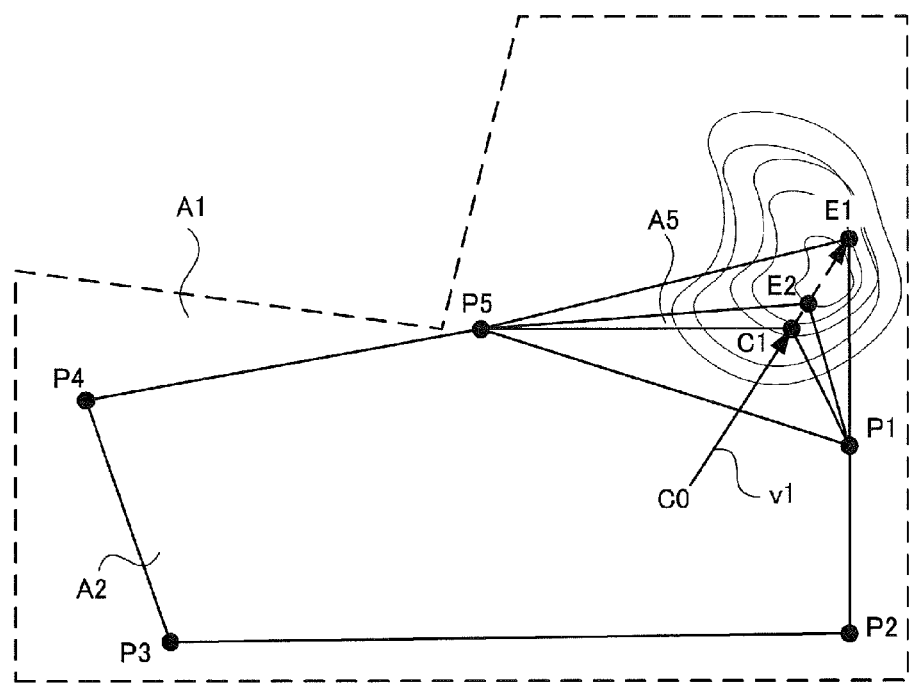
FIG. 18 is a diagram for explaining another specific example of an extension update process of receivable area information in the second embodiment.

FIGS. 17 and 18 are diagrams for explaining specific examples of an extension update process of receivable area information in the second embodiment. The specific examples of an extension update process in the second embodiment will be described below with reference to FIGS. 17 and 18.

Similarly to FIG. 5, each of FIGS. 17 and 18 illustrates an actual receivable area A1 of a broadcast station B, a receivable area A2 indicated by receivable area information before update for the broadcast station B, which is a pentagonal region specified by vertexes P1 to P5, a current position C1, and a previous reception position C0.

In each of the examples of FIGS. 17 and 18, the broadcast area map generator 35 determines a threshold distance δ according to the signal intensity at the current position C1, obtains a vector v1 from the previous reception position C0 to the current position C1, obtains an extension distance R1 according to a difference between the signal intensity at the current position C1 and the signal intensity at the previous reception position C0, and determines a position E1 apart from the current position in the direction of the vector v1 by the extension distance R1 as a candidate receivable position. The broadcast area map generator 35 refers to map information provided from the map information provider 36. Each of FIGS. 17 and 18 illustrates contour lines included in the map information.

In the example of FIG. 17, as can be seen from the contour lines, there is little difference in height between the current position C1 and the candidate receivable position E1, and there is no particularly high mountain between the position C1 and the position E1. Thus, the broadcast area map generator 35 judges that there is no mountain higher than the predetermined height between the current position C1 and the candidate receivable position E1, and determines the candidate receivable position E1 as a receivable position. Then, the broadcast area map generator 35 extracts vertexes P1 and P5 as an existing vertex whose distance from the receivable position E1 is less than the threshold distance δ, and combines a triangular region A3 formed by the vertexes P1 and P5 and the position E1 with the existing receivable area A2 to obtain a receivable area (A2+A3) after enlargement. Therefore, in the vertex list in the receivable area information of the broadcast station B, the new vertex E1 is added and the vertexes P1, P2, P3, P4, P5, and E1 are recorded in this order.

In the example of FIG. 18, as can be seen from the contour lines, there is a mountain between the current position C1 and the candidate receivable position E1, the candidate receivable position E1 is located on an opposite side of the mountain when viewed from the current position C1, and the broadcast station B is likely to be unreceivable at the candidate receivable position E1. Thus, the broadcast area map generator 35 judges that there is a mountain higher than the predetermined height between the position C1 and the position E1, and determines, as a receivable position, a position E2 that is located on a line segment from the current position C1 to the candidate receivable position E1 and that is located in front of the mountain when viewed from the current position C1 (or on the current position C1 side of the top of the mountain). Then, the broadcast area map generator 35 extracts vertexes P1 and P5 as an existing vertex whose distance from the receivable position E2 is less than the threshold distance δ, and combines a triangular region A5 formed by the vertexes P1 and P5 and the position E2 with the existing receivable area A2 to obtain a receivable area (A2+A5) after enlargement. Therefore, in the vertex list in the receivable area information for the broadcast station B, the new vertex E2 is added and the vertexes P1, P2, P3, P4, P5, and E2 are recorded in this order.

According to the second embodiment described above, in addition to the advantages in the first embodiment, the following advantages can be obtained. The digital broadcast receiver in the second embodiment determines the receivable position based on the map information around the current position. Thus, the receivable position can be determined in view of the topography, obstacles, or the like around the current position, and more accurate receivable area information can be generated. Specifically, a position where a broadcast signal cannot actually be received due to an obstacle or the like can be prevented from being determined as a receivable position, and receivable area information closer to the actual reception state can be generated.

Third Embodiment

Figure 19:
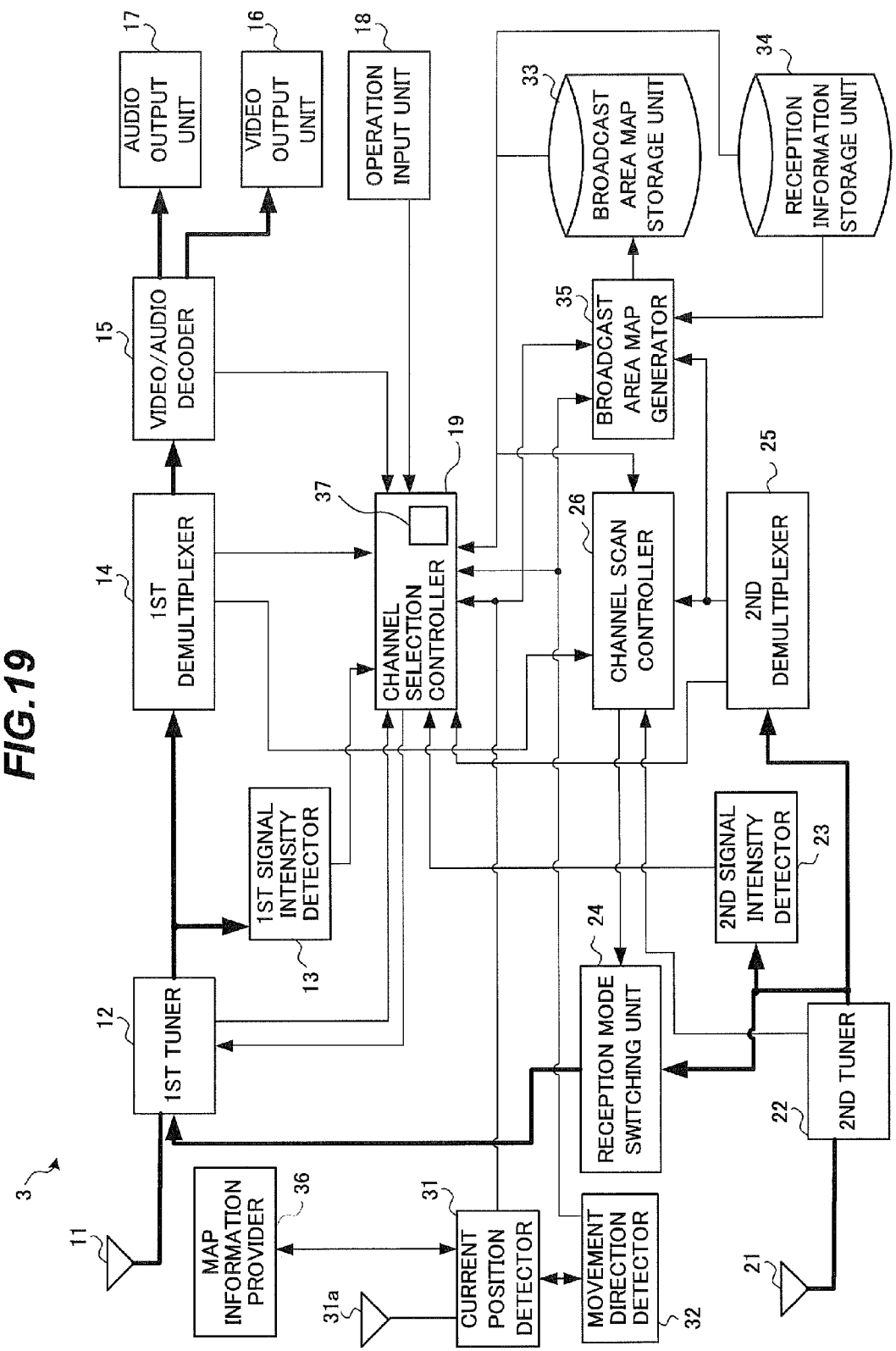
FIG. 19 is a block diagram schematically illustrating a configuration of a digital broadcast receiver according to a third embodiment.

FIG. 19 is a block diagram schematically illustrating a configuration of a digital broadcast receiver 3 in a third embodiment. The digital broadcast receiver 3 is similar to the digital broadcast receiver 2 in the second embodiment except that receivable area information is updated using transmitting station information. Descriptions of elements and processes that are the same as in the second embodiment will be omitted or simplified in the description below.

In FIG. 19, the digital broadcast receiver 3 includes a transmitting station information provider 37 in addition to the configuration of the digital broadcast receiver 2 illustrating in FIG. 15.

The transmitting station information provider 37 provides transmitting station information to the broadcast area map generator 35. The transmitting station information includes information indicating positions of one or more transmitting stations transmitting a broadcast signal, and in this example, further includes information indicating transmission radio wave intensities of the one or more transmitting stations. The transmission radio wave intensity is an intensity of radio wave transmitted from the transmitting station. In the example of FIG. 19, the transmitting station information provider 37 stores information indicating a position and a transmission radio wave intensity of each transmitting station out of channel selection information obtained from a broadcast signal by the first demultiplexer 14, and provides the stored information to the broadcast area map generator 35.

In this embodiment, the broadcast area map generator 35 obtains the transmitting station information from the transmitting station information provider 37, and determines the receivable position based on the transmitting station information. Specifically, when the channel scan controller 26 judges that a physical channel can be received, the broadcast area map generator 35 determines an extension distance according to the signal intensity of the physical channel, and determines a first position apart from the current position in the movement direction by the extension distance. Then, on the basis of transmitting station information indicating positions of one or more transmitting stations transmitting a broadcast signal of the physical channel, the broadcast area map generator 35 judges whether or not there is a second position that is closer to a transmitting station nearest to the current position of the one or more transmitting stations than the first position and that is farther from the current position in the movement direction than the first position. If there is no second position, the broadcast area map generator 35 determines the first position as the receivable position, and if there is a second position, it determines the second position as the receivable position.

Moreover, if there is a second position, the broadcast area map generator 35 judges based on map information around the current position whether or not there is an object higher than a predetermined height between the current position and the second position, and if there is such an object, the broadcast area map generator 35 determines a position closer to the current position than the second position as the receivable position in place of the second position. Moreover, if there is a second position, the broadcast area map generator 35 judges based on map information around the current position whether or not there is an object higher than a predetermined height between the nearest transmitting station and the second position, and if there is such an object, the broadcast area map generator 35 determines a position closer to the current position than the second position as the receivable position in place of the second position.

Moreover, when the channel scan controller 26 judges that a physical channel can be received, the broadcast area map generator 35 determines, based on information indicating positions and transmission radio wave intensities of one or more transmitting stations transmitting a broadcast signal of the physical channel, a threshold distance according to a positional relationship between the current position and a transmitting station nearest to the current position of the one or more transmitting stations and a transmission radio wave intensity of the nearest transmitting station. Specifically, the broadcast area map generator 35 obtains a multiplier according to a distance from the nearest transmitting station to the current position and the transmission radio wave intensity of the nearest transmitting station, and multiplies the signal intensity detected by the second signal intensity detector 23 by the obtained multiplier to determine the threshold distance. For example, the multiplier is set to be greater as the distance from the nearest transmitting station to the current position is smaller and as the transmission radio wave intensity of the nearest transmitting station is higher. The broadcast area map generator 35 may determine the threshold distance according to one of the positional relationship between the current position and the nearest transmitting station thereto and the transmission radio wave intensity of the nearest transmitting station. For example, after determining a threshold distance according to the signal intensity similarly to the first or second embodiment, the broadcast area map generator 35 may multiply the determined threshold distance by a multiplier x according to the transmission radio wave intensity to determine a final threshold distance. For example, the multiplier x is set as follows: if the transmission radio wave intensity is equal to a predetermined intensity, x is equal to 1; if the transmission radio wave intensity is higher than the predetermined intensity, x is greater than 1; and if the transmission radio wave intensity is lower than the predetermined intensity, x is less than 1.

Figure 20:
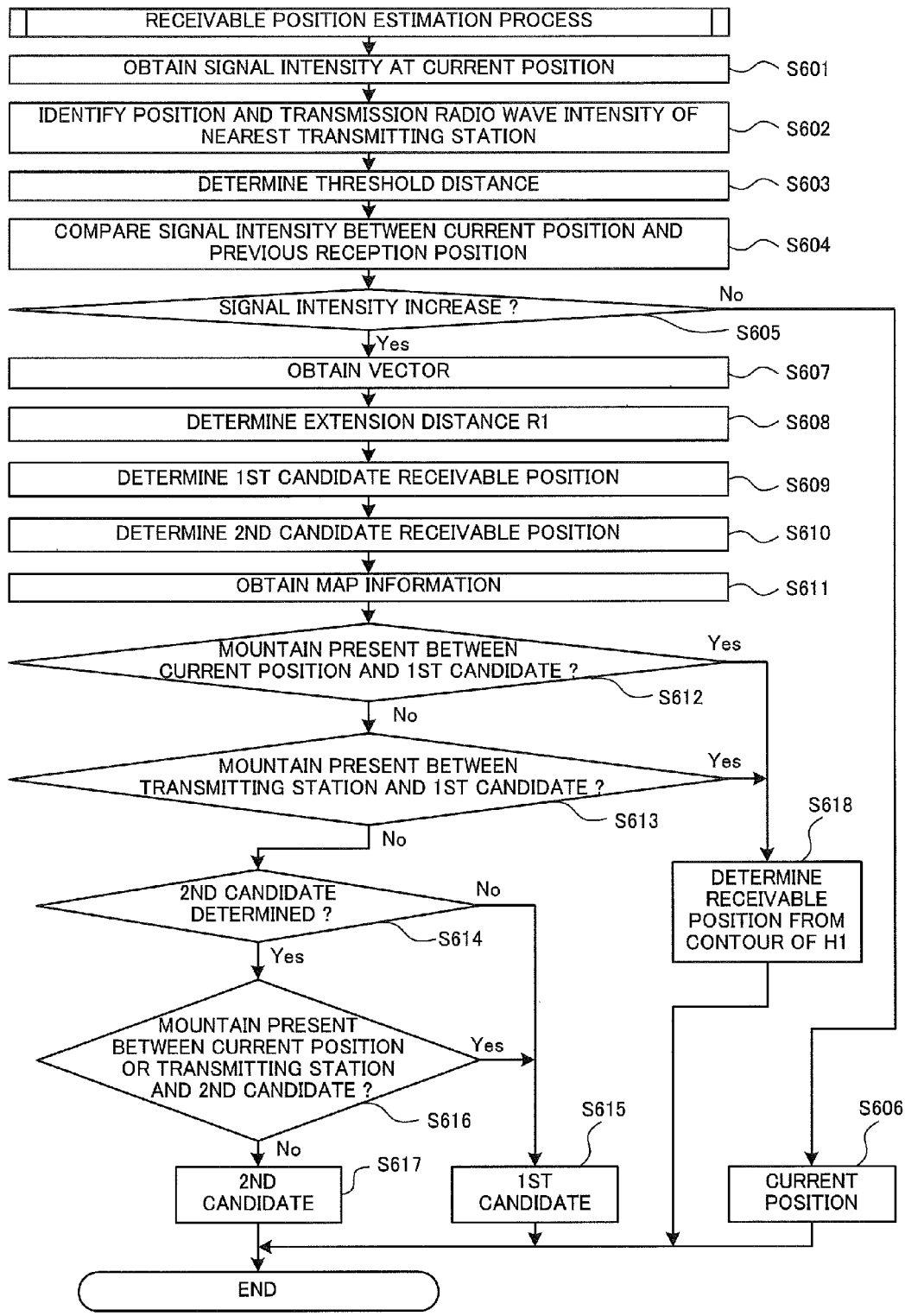
FIG. 20 is a flowchart illustrating a receivable position estimation process in the third embodiment.

FIG. 20 is a flowchart illustrating a receivable position estimation process in the third embodiment. The receivable position estimation process will be described below with reference to FIG. 20. In this example, it is assumed that a broadcast station C has been detected in a channel scan as a broadcast station that can be received.

The broadcast area map generator 35 obtains a signal intensity of a broadcast signal of the broadcast station C from the second signal intensity detector 23 (S601).

Next, the broadcast area map generator 35 obtains transmitting station information from the transmitting station information provider 37, and identifies a position of a transmitting station nearest to the current position of transmitting stations transmitting a broadcast signal of the broadcast station C and a transmission radio wave intensity of the nearest transmitting station (S602).

Next, the broadcast area map generator 35 determines a threshold distance δ based on the signal intensity obtained in step S601 and the information concerning the transmitting station identified in step S602. Specifically, the broadcast area map generator 35 obtains a multiplier x according to a distance between the nearest transmitting station and the current position and the transmission radio wave intensity of the nearest transmitting station, and multiplies the signal intensity by the multiplier x to calculate the threshold distance δ. The multiplier x may be obtained by using a table defining a correspondence between combinations of a distance from a transmitting station and a transmission radio wave intensity of a transmitting station and values of multiplier x, or may be calculated by a calculation formula, for example.

Next, the broadcast area map generator 35 compares the signal intensity of the broadcast station C at the previous reception position and the signal intensity of the broadcast station C at the current position (S604). If the signal intensity at the current position is lower than or equal to that at the previous reception position (No in step S605), the broadcast area map generator 35 determines the current position as the receivable position (S606), and ends the receivable position estimation process.

On the other hand, if the signal intensity at the current position is higher than that at the previous reception position (Yes in step S605), the broadcast area map generator 35 obtains a vector from the previous reception position to the current position as a movement direction (S607) and determines an extension distance (or radius) R1 on the basis of an amount of increase in the signal intensity (S608), similarly to steps S405 and S406 in FIG. 13. Then, the broadcast area map generator 35 determines a position displaced from the current position in the vector direction by the extension distance R1 as a first candidate receivable position (S609).

The broadcast area map generator 35 determines a second candidate receivable position by using the transmitting station information (S610). Specifically, the broadcast area map generator 35 obtains a point closest to the nearest transmitting station on a straight line extending in the vector direction through the current position (i.e., an intersection point of the straight line and a perpendicular line dropped from the position of the nearest transmitting station to the straight line), and judges whether or not the obtained point satisfies a condition that the obtained point is located on a half line extending in the vector direction from the current position and a distance from the current position to the obtained point is greater than a distance from the current position to the first candidate receivable position. If the condition is satisfied, the broadcast area map generator 35 determines the obtained point as a second candidate receivable position, and if the condition is not satisfied, it determines no second candidate receivable position.

Next, the broadcast area map generator 35 obtains map information around the current position from the map information provider 36 (S611).

The broadcast area map generator 35 refers to the obtained map information and judges whether or not there is a mountain higher than a predetermined height between the current position and the first candidate receivable position (S612), similarly to step S509 in FIG. 16.

If there is no mountain between the current position and the first candidate receivable position (No in step S612), the broadcast area map generator 35 refers to the map information and judges whether or not there is a mountain higher than a predetermined height between the nearest transmitting station and the first candidate receivable position (S613). The specific judgment condition in step S613 is similar to that in step S509 in FIG. 16.

If there is no mountain between the nearest transmitting station and the first candidate receivable position (No in step S613), the broadcast area map generator 35 judges whether or not the second candidate receivable position is determined in step S610 (S614). If no second candidate receivable position is determined (No in step S614), the broadcast area map generator 35 determines the first candidate receivable position as the receivable position (S615), and ends the receivable position estimation process.

If the second candidate receivable position is determined (Yes in step S614), the broadcast area map generator 35 refers to the map information and judges whether or not there is a mountain higher than a predetermined height between the current position and the second candidate receivable position or there is a mountain higher than a predetermined height between the nearest transmitting station and the second candidate receivable position (S616). The specific judgment condition in step S616 is similar to that in step S509 in FIG. 16.

If there is no mountain between the current position and the second candidate receivable position and there is no mountain between the nearest transmitting station and the second candidate receivable position (No in step S616), the broadcast area map generator 35 determines the second candidate receivable position as the receivable position (S617), and ends the receivable position estimation process.

If there is a mountain between the current position and the second candidate receivable position or there is a mountain between the nearest transmitting station and the second candidate receivable position (Yes in step S616), the broadcast area map generator 35 determines the first candidate receivable position as the receivable position (S615), and ends the receivable position estimation process.

In step S612, if it is judged that there is a mountain between the current position and the first candidate receivable position (Yes in step S612), the broadcast area map generator 35 determines, as the receivable position, an intersection point closest to the current position of intersection points of a contour line of a height of H1 from the current position and a half line extending from the current position in the vector direction (S618), similarly to step S511 in FIG. 16, and ends the receivable position estimation process. The height H1 is a threshold value that is set in advance and corresponds to a height of mountain not precluding the reception, and is, for example, set to a value not greater than the predetermined threshold H.

In step S613, if it is judged that there is a mountain between the nearest transmitting station and the first candidate receivable position (Yes in step S613), the broadcast area map generator 35 determines, as the receivable position, an intersection point closest to the current position of intersection points of a contour line of a height of H2 from the current position and a half line extending from the current position in the vector direction (S618), similarly to step S511 in FIG. 16, and ends the receivable position estimation process. However, if there is no such intersection point, the broadcast area map generator 35 determines the current position as the receivable position, and ends the receivable position estimation process. The above height H2 is a threshold value that is set in advance and corresponds to a height of mountain not precluding the reception, and is, for example, set to a value not greater than the predetermined threshold H. The height H2 may be the same as or different from the height H1.

The criteria (e.g., thresholds in height) for judging whether or not there is a mountain higher than a predetermined height in steps S612, S613, and S616 may be the same as or different from each other.

Figure 21:
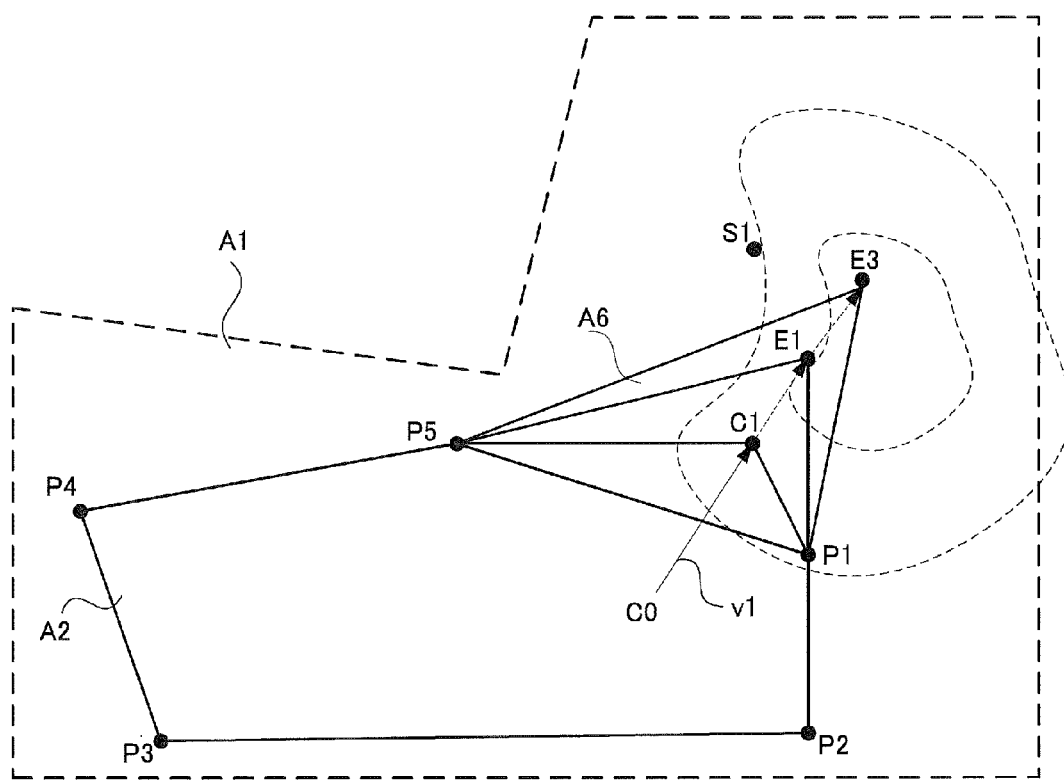
FIG. 21 is a diagram for explaining a specific example of an extension update process of receivable area information in the third embodiment.
Figure 22:
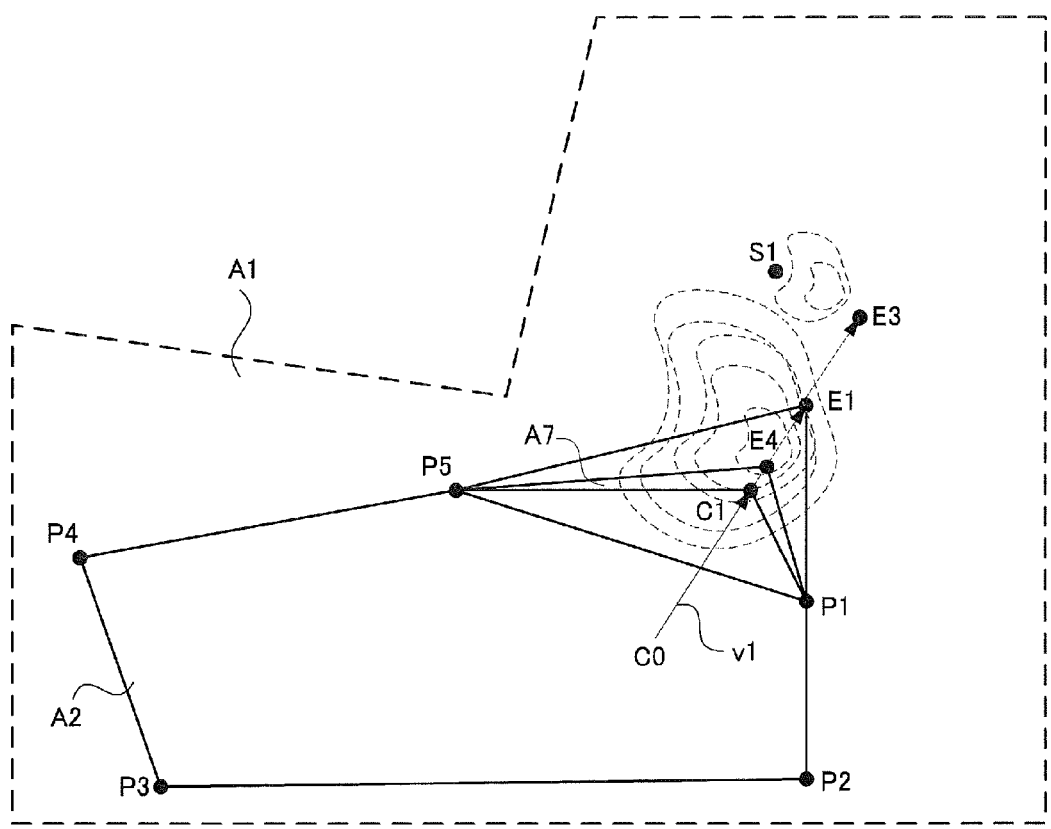
FIG. 22 is a diagram for explaining another specific example of an extension update process of receivable area information in the third embodiment.

FIGS. 21 and 22 are diagrams for explaining specific examples of an extension update process of receivable area information in the third embodiment. The specific examples of an extension update process in the third embodiment will be described below with reference to FIGS. 21 and 22.

Similarly to FIG. 5, each of FIGS. 21 and 22 illustrates an actual receivable area A1 of a broadcast station B, a receivable area A2 indicated by receivable area information before update of the broadcast station B, which is a pentagonal region specified by vertexes P1 to P5, a current position C1, and a previous reception position C0. Further, each of FIGS. 21 and 22 illustrates a position S1 of a transmitting station nearest to the current position C1 of transmitting stations transmitting a broadcast signal of the broadcast station B.

In each of the examples of FIGS. 21 and 22, the broadcast area map generator 35 determines a threshold distance δ according to the signal intensity at the current position C1, a distance between the current position C1 and the transmitting station position S1, and a transmission radio wave intensity of the transmitting station at the position S1. The broadcast area map generator 35 obtains a vector v1 from the previous reception position C0 to the current position C1, obtains an extension distance R1 according to a difference between the signal intensity at the current position C1 and the signal intensity at the previous reception position C0, and determines a position E1 apart from the current position in the direction of the vector v1 by the extension distance R1 as a first candidate receivable position. Further, the broadcast area map generator 35 obtains a position E3 where a straight line extending in the direction of the vector v1 through the current position C1 intersects a perpendicular line drawn from the transmitting station position S1 to the straight line. In each of the examples of FIGS. 21 and 22, the position E3 is located on a half line extending from the current position C1 in the vector v1 direction, and a distance from the current position C1 to the position E3 is greater than a distance from the current position C1 to the position E1. Therefore, the broadcast area map generator 35 determines the position E3 as a second candidate receivable position.

The broadcast area map generator 35 refers to map information provided from the map information provider 36. Each of FIGS. 21 and 22 illustrates contour lines included in the map information.

In the example of FIG. 21, as can be seen from the contour lines, there is little difference in height between the current position C1, the first candidate receivable position E1, the second candidate receivable position E3, and the transmitting station position S1, and there is no particularly high mountain between the respective positions. Thus, the broadcast area map generator 35 judges that there is no mountain higher than the predetermined height between the respective positions, and determines the second candidate receivable position E3 as a receivable position. Then, the broadcast area map generator 35 extracts vertexes P1 and P5 as an existing vertex whose distance from the receivable position E3 is less than the threshold distance δ, and combines a triangular region A6 formed by the vertexes P1 and P5 and the position E3 with the existing receivable area A2 to obtain a receivable area (A2+ A6) after enlargement. Therefore, in the vertex list in the receivable area information for the broadcast station B, the new vertex E3 is added and the vertexes P1, P2, P3, P4, P5, and E3 are recorded in this order.

In the example of FIG. 22, as can be seen from the contour lines, there is a mountain between the current position C1 and the first candidate receivable position E1, the first candidate receivable position E1 is located on an opposite side of the mountain when viewed from the current position C1, and the broadcast station B is likely to be unreceivable at the first candidate receivable position E1. Also, there is a mountain between the transmitting station position S1 and the second candidate receivable position E3, and although the position E3 is closer to the transmitting station position S1, the broadcast station B is likely to be unreceivable at the second candidate receivable position E3. Thus, the broadcast area map generator 35 determines, as a receivable position, a position E4 that is located on a line segment from the current position C1 to the position E1 and that is located in front of the mountain when viewed from the current position C1 (or on the current position C1 side of the top of the mountain). Then, the broadcast area map generator 35 extracts vertexes P1 and P5 as an existing vertex whose distance from the receivable position E4 is less than the threshold distance δ, and combines a triangular region A7 formed by the vertexes P1 and P5 and the position E4 with the existing receivable area A2 to obtain a receivable area (A2+A7) after enlargement. Therefore, in the vertex list in the receivable area information of the broadcast station B, the new vertex E4 is added and the vertexes P1, P2, P3, P4, P5, and E4 are recorded in this order.

According to the third embodiment described above, in addition to the advantages in the first and second embodiments, the following advantages can be obtained. The digital broadcast receiver in the third embodiment determines the receivable position based on the transmitting station information indicating a position or a transmission radio wave intensity of a transmitting station. Thus, the receivable position can be determined in view of a position or a transmission radio wave intensity of a transmitting station, and more accurate receivable area information can be generated. For example, a position where a broadcast signal cannot actually be received can be prevented from being determined as a receivable position, and receivable area information closer to the actual reception state can be generated.

The above description shows an example in which the configuration using the transmitting station information is applied to the second embodiment. However, such a configuration (or features of the third embodiment) may be applied to the first embodiment.

Fourth Embodiment

A digital broadcast receiver in a fourth embodiment is similar to the digital broadcast receiver 3 in the third embodiment except that a detected signal intensity is corrected based on weather information. Descriptions of elements and processes that are the same as in the third embodiment will be omitted or simplified in the description below.

In this embodiment, the broadcast area map generator 35 corrects a signal intensity detected by the second signal intensity detector 23 based on weather information indicating weather at the time of detection of the signal intensity, and updates receivable area information using the corrected signal intensity. Specifically, the broadcast area map generator 35 corrects the signal intensity so as to cancel the effect of the weather on the signal intensity. For example, the broadcast area map generator 35 estimates a signal intensity in the reference weather (e.g., clear weather) from the detected signal intensity based on the weather at the time of detection as the corrected signal intensity. The broadcast area map generator 35 may use the corrected signal intensity in all or part of the processes using the signal intensity.

A specific example in the fourth embodiment will be described below.

FIG. 23 is a diagram illustrating an example of reception information table in the fourth embodiment. The reception information table 2300 in FIG. 23 is the same as the reception information table 400 in FIG. 4 except that weather information is stored for each physical channel.

When the channel scan controller 26 judges that a physical channel can be received, the broadcast area map generator 35 refers to information in the reception information table 2300 as information at the time of the previous reception, updates the receivable area information for the physical channel, and then updates reception information for the physical channel in the reception information table 2300. At this time, weather information is updated to information indicating the weather at the time of the reception judgment by the channel scan controller 26.

FIG. 24 is a flowchart illustrating a receivable position estimation process in the fourth embodiment. The receivable position estimation process will be described below with reference to FIG. 24. In this example, it is assumed that a broadcast station C has been detected in a channel scan as a broadcast station that can be received.

The process in FIG. 24 is similar to that in FIG. 20 except for the process in step S704.

In step S704, the broadcast area map generator 35 obtains the signal intensity and the weather information at the previous reception of the broadcast station C from the reception information table, and corrects the signal intensity at the previous reception based on the weather information at the previous reception. For example, when the weather at the previous reception is rainy weather, the signal intensity at the previous reception is considered to be lower than that in the reference weather (or clear weather), and the value of the signal intensity at the previous reception is corrected to be increased. Then, the broadcast area map generator 35 compares the corrected signal intensity at the previous reception and the signal intensity at the current position. Also, in later steps S605 and S608, the signal intensity corrected based on the weather information is used as the signal intensity at the previous reception.

The above description shows an example in which only the signal intensity at the previous reception is corrected based on the weather information. However, the signal intensity at the current position may be corrected based on the current weather information. For example, the signal intensity at the current position may be corrected based on the current weather information in step S601, and the corrected signal intensity may be used as the signal intensity at the current position in and after step S602.

According to the fourth embodiment described above, in addition to the advantages in the first to third embodiments, the following advantages can be obtained. The digital broadcast receiver in the fourth embodiment corrects the detected signal intensity based on the weather information at the detection, and updates the receivable area information using the corrected signal intensity. Thus, the receivable position can be determined in view of change or deterioration in the reception state due to weather, and more accurate receivable area information can be generated.

The above description shows an example in which the configuration of correcting the signal intensity based on the weather information is applied to the third embodiment. However, such a configuration (or features of the fourth embodiment) may be applied to the first or second embodiment.

The functions of the digital broadcast receiver in the first to fourth embodiments may be implemented purely by electronic circuits and other hardware resources, or by combined operation of hardware resources and software resources. In the latter case, the functions may be implemented by execution of a computer program by a computing device. The computer program may be stored in a recording medium such as a read-only memory (ROM), and the program may be read into the computer's main memory and executed by its central processing unit (CPU). The program may also be recorded on a computer-readable medium such as an optical disc, or may be provided through a communication channel or network such as the Internet.

Those skilled in the art will recognize that further variations are possible within the scope of the invention, which is defined in the appended claims.

For example, the above description shows an example in which reception area information is updated based on the receivability judgment result obtained in the channel scan. However, reception area information may be updated based on another receivability judgment result, such as that obtained during channel selection for program viewing.

What is claimed is:

1. A digital broadcast receiver mounted on a mobile body, the digital broadcast receiver comprising:
   a tuner configured to receive a broadcast signal of a physical channel transmitted by digital broadcasting;
   a signal intensity detector configured to detect a signal intensity of the broadcast signal received by the tuner;

a current position detector configured to detect a current position of the mobile body;

a movement direction detector configured to detect a movement direction of the mobile body;

a reception judging unit configured to control the tuner to judge whether or not the physical channel can be received;

an area information storage unit configured to store receivable area information indicating a receivable area of the physical channel; and an area information updating unit configured to extend the receivable area of the physical channel stored in the area information storage unit, when the reception judging unit judges that the physical channel can be received, by determining an extension distance according to the signal intensity of the broadcast signal at the current position and calculating a first position located ahead of the current position in the movement direction an amount corresponding to the determined extension distance as an extended receivable position, and update the receivable area information stored in the area information storage unit to include the calculated extended receivable position.

2. The digital broadcast receiver of claim 1, wherein the physical channel is one of a plurality of physical channels transmitted by digital broadcasting;

the tuner selects and receives a broadcast signal of a physical channel designated from among the plurality of physical channels;

the reception judging unit controls the tuner to perform a channel scan to sequentially select the physical channels, and judges, for each of the plurality of physical channels, whether or not the physical channel can be received;

the area information storage unit stores, for each of the plurality of physical channels, receivable area information indicating a receivable area of the physical channel; and the area information updating unit extends the receivable area of a physical channel stored in the area information storage unit, when the reception judging unit judges in the channel scan that a physical channel of the plurality of physical channels can be received.

3. The digital broadcast receiver of claim 2, further comprising:

a channel selection controller configured to control the tuner to select a physical channel to be viewed, wherein the tuner includes a first tuner and a second tuner, and while the channel selection controller controls the first tuner to select a physical channel to be viewed, the reception judging unit controls the second tuner to perform the channel scan.

4. The digital broadcast receiver of claim 1, wherein the area information updating unit determines the extended receivable position based on map information around the current position.

5. The digital broadcast receiver of claim 4, wherein when the reception judging unit judges that the physical channel can be received, the area information updating unit judges based on the map information whether or not there is an object higher than a predetermined height between the current position and the first position, and if it is judged that there is no object, determines the first position as the extended receivable position.

6. The digital broadcast receiver of claim 5, wherein if it is judged that there is an object higher than the predetermined height between the current position and the first position, the area information updating unit determines a second position closer to the current position than the first position as the extended receivable position.

7. The digital broadcast receiver of claim 1, wherein the area information updating unit determines the extended receivable position based on transmitting station information indicating positions of one or more transmitting stations transmitting the broadcast signal of the physical channel.

8. The digital broadcast receiver of claim 7, wherein when the reception judging unit judges that the physical channel can be received, the area information updating unit judges based on the transmitting station information whether or not there is a second position that is closer to a transmitting station nearest to the current position of the one or more transmitting stations than the first position and that is farther from the current position in the movement direction than the first position, and if there is no second position, determines the first position as the extended receivable position, and if there is a second position, determines the second position as the extended receivable position.

9. The digital broadcast receiver of claim 8, wherein if there is a second position, the area information updating unit judges based on map information around the current position whether or not there is an object higher than a predetermined height between the current position and the second position, and if there is an object, determines a position closer to the current position than the second position as the extended receivable position in place of the second position.

10. The digital broadcast receiver of claim 8, wherein if there is a second position, the area information updating unit judges based on map information around the current position whether or not there is an object higher than a predetermined height between the nearest transmitting station and the second position, and if there is an object, determines a position closer to the current position than the second position as the extended receivable position in place of the second position.

11. The digital broadcast receiver of claim 1, wherein when the reception judging unit judges that the physical channel can be received, the area information updating unit determines the extension distance according to a difference between the signal intensity detected by the signal intensity detector at this time and a signal intensity detected by the signal intensity detector when the reception judging unit previously judged that the physical channel can be received.

12. The digital broadcast receiver of claim 1, wherein the receivable area information includes polygon information specifying a polygon representing the receivable area;

when updating the receivable area information, the area information updating unit updates the polygon information so as to enlarge the polygon specified by the polygon information;

the polygon after the enlargement is a polygon obtained by combining an additional polygon having a vertex at the extended receivable position with the polygon before the enlargement; and the additional polygon is a polygon formed by two sides connecting the extended receivable position and two vertexes of the polygon before the enlargement and at least one side of the polygon before the enlargement.

13. The digital broadcast receiver of claim 12, wherein the area information updating unit determines a threshold distance according to the signal intensity detected by the signal intensity detector, and if the vertexes of the polygon before the enlargement include two or more vertexes whose distance from the extended receivable position is less than the threshold distance, determines the two vertexes from among the two or more vertexes.

14. The digital broadcast receiver of claim 13, wherein the area information updating unit determines the threshold distance based on information indicating positions of one or more transmitting stations transmitting the broadcast signal of the physical channel, or information indicating positions and transmission radio wave intensities of one or more transmitting stations transmitting the broadcast signal of the physical channel.

15. The digital broadcast receiver of claim 14, wherein the area information updating unit obtains a multiplier according to one or both of a distance between the current position and a transmitting station nearest to the current position of the one or more transmitting stations and a transmission radio wave intensity of the nearest transmitting station, and determines the threshold distance by multiplying the signal intensity detected by the signal intensity detector by the multiplier.

16. The digital broadcast receiver of claim 12, wherein the area information updating unit determines, as the two vertexes of the polygon before the enlargement, two vertexes closest to the extended receivable position of vertexes of the polygon before the enlargement.

17. The digital broadcast receiver of claim 1, wherein the area information updating unit corrects the signal intensity detected by the signal intensity detector based on weather information indicating weather when the signal intensity is detected, and updates the receivable area information by using the corrected signal intensity.

18. The digital broadcast receiver of claim 1, wherein when the reception judging unit judges that the physical channel can be received, if receivable area information for the physical channel is already stored in the area information storage unit, the area information updating unit updates the receivable area information, and if not, the area information updating unit newly generates receivable area information for the physical channel and stores the generated receivable area information in the area information storage unit.

19. The digital broadcast receiver of claim 1, further comprising:
a channel selection controller configured to control the tuner to select a physical channel to be viewed, wherein when it is determined that the reception state of the physical channel to be viewed is deteriorated, the channel selection controller searches for, with reference to information stored in the area information storage unit, an alternative physical channel that has a high possibility of providing the same program as a currently viewed program provided by the physical channel to be viewed and that can be received at the current position detected by the current position detector, and if the alternative physical channel is found, controls the tuner to select the alternative physical channel.

20. A method of updating information for a digital broadcast receiver that is mounted on a mobile body and includes a tuner for receiving a broadcast signal of a physical channel transmitted by digital broadcasting, the method comprising:
detecting a signal intensity of the broadcast signal received by the tuner;
detecting a current position of the mobile body;
detecting a movement direction of the mobile body;
controlling the tuner to judge whether or not the physical channel can be received; and
extending a receivable area of the physical channel stored indicated by receivable area information, when it is judged that the physical channel can be received, by determining an extension distance according to the signal intensity of the broadcast signal at the current position and calculating a first position located ahead of the detected current position in the detected movement direction an amount corresponding to the determined extension distance, and updating the receivable area information to include the calculated first position.

* * * * *